(12) United States Patent
Hosoito et al.

(10) Patent No.: US 8,704,467 B2
(45) Date of Patent: Apr. 22, 2014

(54) INVERTER DEVICE FOR WASHING MACHINE

(75) Inventors: Tsuyoshi Hosoito, Tokyo (JP); Isamu Nitta, Tokyo (JP)

(73) Assignees: Kabushiki Kaisha Toshiba, Tokyo (JP); Toshiba Consumer Electronics Holdings Corporation, Tokyo (JP); Toshiba Home Appliances, Tokyo (JP)

( * ) Notice: Subject to any disclaimer, the term of this patent is extended or adjusted under 35 U.S.C. 154(b) by 1021 days.

(21) Appl. No.: 12/741,768

(22) PCT Filed: Nov. 4, 2008

(86) PCT No.: PCT/JP2008/003164
§ 371 (c)(1),
(2), (4) Date: May 6, 2010

(87) PCT Pub. No.: WO2009/060588
PCT Pub. Date: May 14, 2009

(65) Prior Publication Data
US 2010/0242549 A1    Sep. 30, 2010

(30) Foreign Application Priority Data
Nov. 7, 2007  (JP) ................................ 2007-289886

(51) Int. Cl.
*H02P 3/08* (2006.01)
*D06F 33/00* (2006.01)
*H02P 3/18* (2006.01)

(52) U.S. Cl.
USPC . 318/370; 318/437; 318/400.02; 318/400.09; 318/779; 68/12.02; 68/12.12

(58) Field of Classification Search
USPC ............... 318/400.02, 400.09, 437, 362, 779, 318/370; 310/156.38, 156.43, 156.44; 68/12.02, 12.04, 12.06, 12.12
See application file for complete search history.

(56) References Cited

U.S. PATENT DOCUMENTS 4,195,500 A  *  4/1980  Tobita et al. ................. 68/12.04
5,773,908 A  *  6/1998  Stephens et al. ....... 310/216.094

(Continued)

FOREIGN PATENT DOCUMENTS

JP    63-220749    9/1988
JP    06-102054    4/1994

(Continued)

OTHER PUBLICATIONS

English Language Abstract of JP H10-155262, published Jun. 9, 1998.

(Continued)

*Primary Examiner* — Paul Ip
(74) *Attorney, Agent, or Firm* — DLA Piper LLP (US)

(57) ABSTRACT

An inverter device provided on a washing machine for controlling a permanent magnet motor being provided with a rotor magnet including a first permanent magnet and a second permanent magnet having a level of coercivity smaller than the first permanent magnet. An excitation current is produced to vary the amount of magnetism of the second permanent magnet to execute a dehydrate operation with a magnetic flux of the rotor magnet reduced and to execute an operation being specified to operate at a lower maximum rotation count compared to the dehydrate operation with the magnetic flux of the rotor magnet increased. When the amount of magnetism of the second permanent magnet is varied while rotation of the permanent magnet motor is stopped, a phase of the excitation current for varying the amount of magnetism is switched depending on a rotation stop position of the rotor.

7 Claims, 19 Drawing Sheets

(56) References Cited

U.S. PATENT DOCUMENTS

| | | | | |
|---|---|---|---|---|
| 5,778,703 | A * | 7/1998 | Imai et al. | 68/12.02 |
| 5,913,952 | A * | 6/1999 | Kim | 8/159 |
| 6,041,625 | A * | 3/2000 | Nagai et al. | 68/12.02 |
| 6,060,851 | A * | 5/2000 | Imai et al. | 318/437 |
| 6,257,027 | B1 * | 7/2001 | Imai | 68/12.12 |
| RE37,576 | E * | 3/2002 | Stephens et al. | 310/254.1 |
| 6,369,538 | B1 * | 4/2002 | Youn et al. | 318/362 |
| 6,445,879 | B1 * | 9/2002 | Youn et al. | 388/811 |
| 6,737,828 | B2 * | 5/2004 | Kiuchi et al. | 318/779 |
| 6,748,618 | B1 * | 6/2004 | Darby et al. | 8/159 |
| 7,017,377 | B2 * | 3/2006 | Hosoito et al. | 68/12.16 |
| 7,579,798 | B2 * | 8/2009 | Hosoito et al. | 318/400.02 |
| 7,692,349 | B2 * | 4/2010 | Ahn | 310/156.43 |
| 7,812,557 | B2 * | 10/2010 | Maekawa | 318/400.32 |
| 7,923,879 | B2 * | 4/2011 | Nitta | 310/156.44 |
| 8,129,931 | B2 * | 3/2012 | Maekawa et al. | 318/400.02 |
| 8,134,267 | B2 * | 3/2012 | Kim | 310/156.38 |
| 2002/0189301 | A1 * | 12/2002 | Hosoito et al. | 68/12.02 |
| 2003/0020431 | A1 * | 1/2003 | Kiuchi et al. | 318/779 |
| 2005/0160771 | A1 * | 7/2005 | Hosoito et al. | 68/12.16 |
| 2006/0042328 | A1 * | 3/2006 | Komatsu et al. | 68/12.06 |
| 2006/0053838 | A1 * | 3/2006 | Inuzuka et al. | 68/3 R |
| 2006/0053839 | A1 * | 3/2006 | Matsushima et al. | 68/3 R |
| 2006/0091754 | A1 * | 5/2006 | Kim et al. | 310/156.55 |
| 2006/0156766 | A1 * | 7/2006 | Ioku | 68/15 |
| 2006/0177204 | A1 * | 8/2006 | Zeh et al. | 388/804 |
| 2007/0107474 | A1 * | 5/2007 | Jun | 68/12.23 |
| 2007/0113598 | A1 * | 5/2007 | Jun et al. | 68/140 |
| 2007/0125135 | A1 | 6/2007 | Kim | |
| 2007/0216250 | A1 * | 9/2007 | Ahn | 310/156.43 |
| 2008/0297099 | A1 * | 12/2008 | Maekawa | 318/799 |
| 2009/0056385 | A1 * | 3/2009 | Maekawa | 68/12.16 |
| 2009/0115361 | A1 * | 5/2009 | Nitta | 318/400.09 |
| 2009/0224622 | A1 * | 9/2009 | Kim | 310/156.38 |
| 2009/0267546 | A1 * | 10/2009 | Maekawa et al. | 318/400.02 |

FOREIGN PATENT DOCUMENTS

| | | |
|---|---|---|
| JP | 06-312085 | 11/1994 |
| JP | H07-336980 | 12/1995 |
| JP | H10-155262 | 6/1998 |
| JP | 2001-146369 | 5/2001 |
| JP | 2003-181187 | 2/2003 |
| JP | 2003-284296 | 10/2003 |
| JP | 2003-333887 | 11/2003 |
| JP | 2004-23839 | 1/2004 |
| JP | 2005-304204 | 10/2005 |
| JP | 2005-334346 | 12/2005 |
| JP | 2006-280195 | 10/2006 |

OTHER PUBLICATIONS

Machine English Language Translation of JP H10-155262, published Jun. 9, 1998.
English Language Abstract of JP 2006-280195, published Oct. 12, 2006.
Machine English Language Translation of JP 2006-280195, published Oct. 12, 2006.
English Language Abstract of JP H07-336980, published Dec. 22, 1995.
Machine English Language Translation of JP H07-336980; published Dec. 22, 1995.
English Language Abstract of JP 2003-181187, published Feb. 7, 2003.
Machine English Language Translation of JP 2003-181187, published Feb. 7, 2003.
English Language Abstract of JP 2001-146369, published May 29, 2001.
Machine English Language Translation of JP 2001-146369, published May 29, 2001.
English Language Abstract of JP 2003-333887, published Nov. 21, 2003.
Machine English Language Translation of JP 2003-333887, published Nov. 21, 2003.
English Language Abstract of JP 2005-334346, published Dec. 8, 2005.
Machine English Language Translation of JP 2005-334346, published Dec. 8, 2005.
English Language Abstract of JP 2003-284296, published Oct. 3, 2003.
Machine English Language Translation of JP 2003-284296, published Oct. 3, 2003.
English Language Abstract of JP 2005-304204, published Oct. 27, 2005.
Machine English Language Translation of JP 2005-304204, published Oct. 27, 2005.
Search Report issued in PCT/JP2008/003164, dated Feb. 3, 2009.
English Translation of Search Report issued in PCT/JP2008/003164, dated Feb. 3, 2009.
Search Report issued in International Application No. PCT/JP2008/003163 dated Jan. 13, 2009.
English Lanbuage Abstract of JP 2004-020839, published Jan. 22, 2004.
Machine English Language Translation of JP 2004-023839, published Jan. 22, 2004.
English Language Abstract of JP 06-312085, published Nov. 8, 1994.
Machine English Language Translation of JP 06-312085, published Nov. 8, 1994.
English Language Abstract of JP 06-102054, published Apr. 12, 1994.
Machine English Language Translation of of JP 06-102054, published Apr. 12, 1994.
English Language Abstract of JP 63-220749, published Sep. 14, 1988.
Taiwanese office Action issued in TW 097142864 on Feb. 18, 2013.
English Language Translation of Taiwanese office Action issued in TW 097142864 on Feb. 18, 2013.
Korea Office Action issued in KR 10-2012-7016275 on Feb. 25, 2013.
English Language Translation of Korea Office Action issued in KR 10-2012-7016275 on Feb. 25, 2013.
Japanese Office Action issued in JP 2007-289886 on Oct. 30, 2012.
English Language Translation of Japanese Office Action issued in JP 2007-289886 on Oct. 30, 2012.
Japanese Office Action issued in JP 2007-289886 on Jun. 26, 2012.
English Language Translation of Japanese Office Action issued in JP 2007-289886 on Jun. 26, 2012.
Korean Office Action issued in KR 2007-289886 on Oct. 30, 2012.
English Language Translation of Korean Office Action issued in KR 2007-289886 on Oct. 30, 2012.
Korean Office Action issued in KR 10-2010-7012072 on Sep. 6, 2011.
English Translation of Korean Office Action issued in KR 10-2010-7012072 on Sep. 6, 2011.
File History of U.S. Appl. No. 12/741,524.
U.S. Appl. No. 12/741,524.

* cited by examiner

FIG. 4A

| SYMBOL | ITEM | SYMBOL | ITEM |
|---|---|---|---|
| A | WATER SUPPLY/AGITATION STEP | I | BALANCING 2 STEP |
| B | WASH STEP | J | RINSE/DEHYDRATE 2 STEP |
| C | EXHAUST STEP | K | WATER SUPPLY STEP |
| D | BALANCING 1 STEP | L | RINSE/AGITATION 2 STEP |
| E | RINSE/DEHYDRATE 1 STEP | M | EXHAUST STEP |
| F | WATER SUPPLY STEP | N | BALANCING STEP |
| G | RINSE/AGITATION 1 STEP | O | FINAL DEHYDRATE STEP |
| H | EXHAUST STEP | 5 | MAGNETIZATION |
| 1 | MAGNETIZATION | 6 | SMALL DEMAGNETIZATION |
| 2 | LARGE DEMAGNETIZATION | 7 | MAGNETIZATION |
| 3 | MAGNETIZATION | | |
| 4 | LARGE DEMAGNETIZATION | | |

| FIG. 7 |
|---|
| FIG. 7A |
| FIG. 7B |

| FIG. 8 |
|---|
| FIG.8A | FIG.8B |

INVERTER DEVICE FOR WASHING MACHINE

TECHNICAL FIELD

The present disclosure relates to an inverter device that controls permanent magnet motor used in washing machines.

BACKGROUND

Washing machines may include motors that can output low-speed and high-torque during a wash operation and high-speed and low-torque during a dehydrate operation. In order to meet these opposite requirements, motors are generally designed to possess properties that are in between the two extremes. In order to further accelerate the rotation speed during the dehydrate operation, techniques have been conceived to suppress induced voltage by executing a field weakening control in instances where the induced voltage of the motor exceeds the power supply voltage of the inverter circuit. However, because this approach introduces increase in motor current, degradation in motor efficiency is inevitable.

Patent publication 1, for instance, discloses a technique for varying the motor output properties by providing two ring-shaped permanent magnets at the rotor of a brushless DC motor and rotating one of the magnets to vary the field magnetism through change in the position of magnetic pole. The disclosed technique, however, requires a configuration to rotate either of the permanent magnets and thus, significantly confines the structure of the rotor.

Patent Publication 2, on the other hand, discloses a technique of configuring a permanent magnet motor by combining a high coercivity neodymium magnet and a low coercivity alnico magnet and executing a high-speed rotation which increases/decreases the magnetic flux of the alnico magnet to reduce the total linkage flux obtained by the sum of the two types of magnets.

Patent publication 1: JP H10-155262 A
Patent publication 2: JP 2006-280195 A

DISCLOSURE

Problem to be Overcome

Patent publication 2, however, directs application of its disclosure to drive motors for hybrid automobiles and trains, and thus, increases/decreases the magnetic flux of alnico magnet by generating a d-axis current (by field oriented control) for increasing/decreasing the magnetic flux while the motor is rotating. The motor, when in rotation, is given q-axis current and generates induced voltage at the motor winding. In a field oriented control, voltage needs to be applied to the motor to generate d-axis and q-axis current, and in order to generate constant current, the applied voltage is minimized when the generated induced voltage indicates 0V. When the induced voltage is escalated to be equal to the power supply voltage for driving the inverter circuit, motor current cannot be generated even if the output voltage of the inverter circuit is maximized. Thus, magnetization under escalated induced voltage requires an inverter circuit with high output voltage. Further, magnetization under high-speed motor rotation requires even greater output voltage, and thus, further necessitates a step-up transformer which leads to increase in cost.

Exemplary embodiments of the present disclosure were conceived to address the above described issues and in one aspect provides an inverter circuit for use in a washing machine that allows modification in the output properties of a permanent magnet motor employing a particular structure to meet the required properties of operations executed by the washing machine.

Means to Overcome the Problem

An inverter device for washing machine according to an embodiment is provided on a washing machine that executes wash operation by rotational drive force exerted by a permanent magnet motor for controlling the permanent magnet motor, the permanent magnet motor being provided, on a rotor side thereof, with a rotor magnet comprising a first permanent magnet and a second permanent magnet having a level of coercivity smaller than the first permanent magnet, the level of coercivity being small enough to allow variation in an amount of magnetism with ease, the inverter circuit including a position detecting element that detects rotational position of the rotor; wherein an excitation current is produced to vary the amount of magnetism of the second permanent magnet to execute a dehydrate operation with a magnetic flux of the rotor magnet reduced and to execute an operation being specified to operate at a lower maximum rotation count compared to the dehydrate operation with the magnetic flux of the rotor magnet increased and wherein when the amount of magnetism of the second permanent magnet is varied while rotation of the permanent magnet motor is stopped, a phase of the excitation current for varying the amount of magnetism is switched depending on a rotation stop position of the rotor.

By varying the amount of magnetism of the second permanent magnet having relatively smaller coercivity, the magnetic flux of rotor magnet in its entirety can be increased/decreased depending upon the different modes of washing machine operations so that output properties of the permanent magnet motor is optimized. Because the level of induced voltage produced during motor rotation is relatively smaller as compared to those of electric automobiles or trains, etc., magnetism of the second permanent magnet can be readily varied. Thus, washing machines can effectively utilize permanent magnet motors being provided with the second permanent magnet.

Further, because the amount of magnetism of the second permanent magnet is varied while the rotation of the per anent magnet motor is stopped, relatively small level of voltage can be applied to the motor without induced voltage being produced on the windings, thereby allowing the downsizing of the inverter circuit. Noise emission can be further suppressed when varying the amount of magnetism.

Further, because the conduction phase of excitation current for varying the magnetism is switched based on the stop position of the rotor detected by the position detection element, the amount of rotor movement is reduced as much as possible to further suppress noise emission.

An inverter device for washing machine according to an embodiment is provided on a washing machine that executes wash operation by rotational drive force exerted by a permanent magnet motor for controlling the permanent magnet motor, the permanent magnet motor being provided, on a rotor side thereof, with a rotor magnet comprising a first permanent magnet and a second permanent magnet having a level of coercivity smaller than the first permanent magnet, the level of coercivity being small enough to allow variation in an amount of magnetism with ease, wherein an excitation current is produced to vary the amount of magnetism of the second permanent magnet to execute a dehydrate operation with a magnetic flux of the rotor magnet reduced and to execute an operation being specified to operate at a lower maximum rotation count compared to the dehydrate operation with the magnetic flux of the rotor magnet increased and wherein the amount of magnetism of the second permanent magnet is increased when executing a braking operation for completing the dehydrate operation. According to the above described configuration, braking force can be increased to stop the permanent magnet motor in a shorter time span to reduce the run time.

An inverter device for washing machine according to an embodiment is provided on a washing machine that executes wash operation by rotational drive force exerted by a permanent magnet motor for controlling the permanent magnet motor, the permanent magnet motor being provided, on a rotor side thereof, with a rotor magnet comprising a first permanent magnet and a second permanent magnet having a level of coercivity smaller than the first permanent magnet, the level of coercivity being small enough to allow variation in an amount of magnetism with ease, wherein an excitation current is produced to vary the amount of magnetism of the second permanent magnet to execute a dehydrate operation with a magnetic flux of the rotor magnet reduced and to execute an operation being specified to operate at a lower maximum rotation count compared to the dehydrate operation with the magnetic flux of the rotor magnet increased and wherein when a plurality of dehydrate operations being specified with different maximum rotation counts are being executed, amount of decrease in magnetism of the second permanent magnet is increased as the maximum rotation count becomes greater. According to the above described configuration, motor efficiency can be enhanced by varying the magnetic flux of the rotor magnet to an optimal level.

An inverter device for washing machine according to an embodiment is provided on a washing machine that executes wash operation by rotational drive force exerted by a permanent magnet motor for controlling the permanent magnet motor, the permanent magnet motor being provided, on a rotor side thereof, with a rotor magnet comprising a first permanent magnet and a second permanent magnet having a level of coercivity smaller than the first permanent magnet, the level of coercivity being small enough to allow variation in an amount of magnetism with ease, wherein an excitation current is produced to vary the amount of magnetism of the second permanent magnet to execute a dehydrate operation with a magnetic flux of the rotor magnet reduced and to execute an operation being specified to operate at a lower maximum rotation count compared to the dehydrate operation with the magnetic flux of the rotor magnet increased and wherein the excitation current for varying the amount of magnetism is gradually increased. According to the above described configuration, noise emission can be suppressed even more effectively.

An inverter device for washing machine according to an embodiment is provided on a washing machine that executes wash operation by rotational drive force exerted by a permanent magnet motor for controlling the permanent magnet motor, the permanent magnet motor being provided, on a rotor side thereof, with a rotor magnet comprising a first permanent magnet and a second permanent magnet having a level of coercivity smaller than the first permanent magnet, the level of coercivity being small enough to allow variation in an amount of magnetism with ease, wherein an excitation current is produced to vary the amount of magnetism of the second permanent magnet to execute a dehydrate operation with a magnetic flux of the rotor magnet reduced and to execute an operation being specified to operate at a lower maximum rotation count compared to the dehydrate operation with the magnetic flux of the rotor magnet increased and wherein during a wash/rinse operation, when rotation count required for the wash/rinse operation is not obtained, a process for increasing the magnetism of the second permanent magnet is repeated. According to the above described configuration, even if displacement occurs in the conduction angle while drum motor is running and alnico magnet is demagnetized, resulting in a failure to obtain the required torque, the ongoing operation can be continued through remagnetization.

An inverter device for washing machine according to an embodiment is provided on a washing machine that executes wash operation by rotational drive force exerted by a permanent magnet motor for controlling the permanent magnet motor, the permanent magnet motor being provided, on a rotor side thereof, with a rotor magnet comprising a first permanent magnet and a second permanent magnet having a level of coercivity smaller than the first permanent magnet, the level of coercivity being small enough to allow variation in an amount of magnetism with ease, wherein an excitation current is produced to vary the amount of magnetism of the second permanent magnet to execute a dehydrate operation with a magnetic flux of the rotor magnet reduced and to execute an operation being specified to operate at a lower maximum rotation count compared to the dehydrate operation with the magnetic flux of the rotor magnet increased and wherein a magnetism evaluation element is provided that evaluates whether or not the amount of magnetism of the second permanent magnet is properly controlled based on a level of induced voltage produced when the permanent magnet motor is idly rotated by a predetermined rotation speed. According to the above described configuration, functionality evaluation can be performed by the user in the user environment after product shipment of the washing machine. If the coercivity of alnico magnet is reduced over time, the amount of magnetism can be adjusted as appropriate.

An inverter device for washing machine according to an embodiment is provided on a washing machine that executes wash operation by rotational drive force exerted by a permanent magnet motor for controlling the permanent magnet motor, the permanent magnet motor being provided, on a rotor side thereof, with a rotor magnet comprising a first permanent magnet and a second permanent magnet having a level of coercivity smaller than the first permanent magnet, the level of coercivity being small enough to allow variation in an amount of magnetism with ease, wherein an excitation current is produced to vary the amount of magnetism of the second permanent magnet to execute a dehydrate operation with a magnetic flux of the rotor magnet reduced and to execute an operation being specified to operate at a lower maximum rotation count compared to the dehydrate operation with the magnetic flux of the rotor magnet increased and wherein a magnetism evaluation element is provided that evaluates whether or not the amount of magnetism of the second permanent magnet is properly controlled based on a level of a shorting current produced when a short braking operation is executed while the permanent magnet motor is idly rotated at a predetermined speed. According to the above described configuration, variability of magnetism can be tested without the use of elements dedicated for detecting the level of induced voltage.

Effect

According to the inverter device for washing machine described in the present disclosure, in a dehydrate operation in which high-speed rotation and low-output torque is required, the magnetic flux of the rotor magnet of the permanent magnet motor is decreased to suit its output properties, and thus, no longer requires a field weakening control and can be driven without increasing motor current. Thus, the motor can be driven more efficiently to allow the washing machine to run with less electricity consumption. Further, because the inverter circuit can be downsized, noise emission can be suppressed when varying the amount of magnetism.

BRIEF DESCRIPTION OF THE DRAWINGS

FIGS. 4A and 4B collectively referred to as FIG. 4 indicate the steps involved in a full automatic operation of a general washing machine and the increase/decrease in count of motor rotation as the steps progress;

DESCRIPTION OF REFERENCE SYMBOLS

Figure 1:
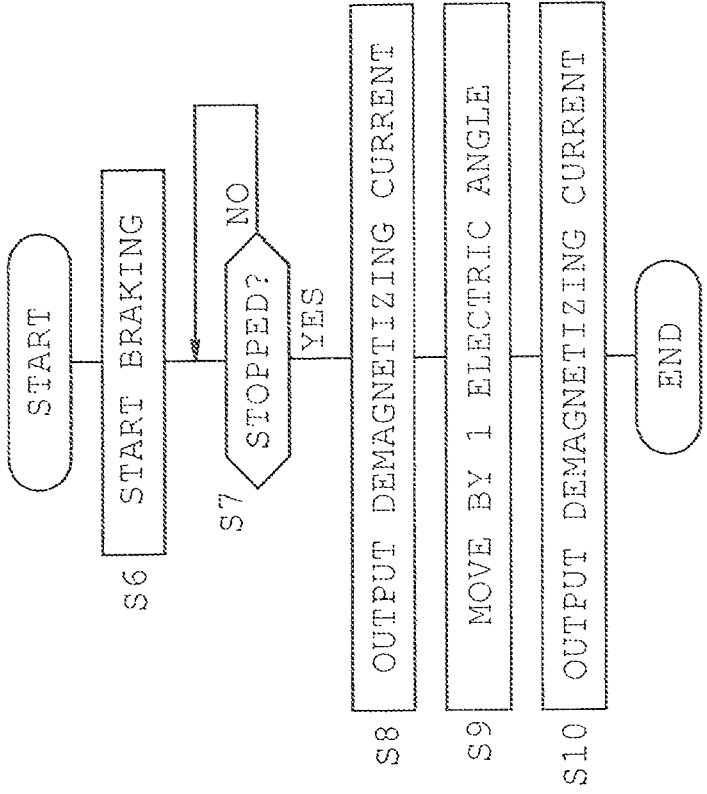
FIG. 1 indicates flowcharts of (a) magnetization and (b) demagnetization of alnico magnet according to a first exemplary embodiment of the present disclosure.
Figure 1:
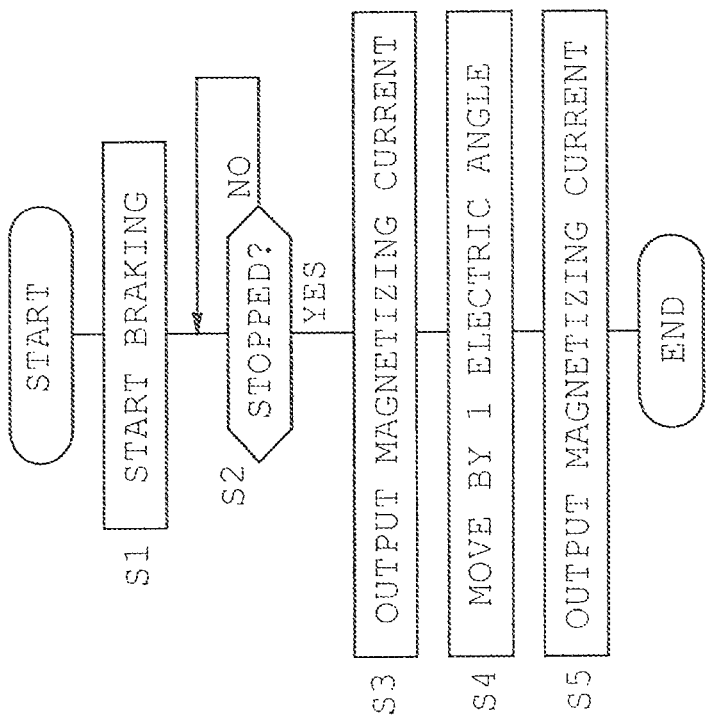

Reference symbol 11 represents a drum motor (permanent magnet motor); 30, a control circuit (magnetization evaluating element); 78, a rotational position sensor (position detecting element); 92, a rotor; 96, a neodymium magnet (first permanent magnet); 97, an alnico magnet (second permanent magnet); 98, a rotor magnet; 99, an inverter; 100, a rotor; 101, a neodymium magnet 101 (first permanent magnet); 102, an alnico magnet (second permanent magnet); and 106, a rotor magnet.

BEST MODE

First Exemplary Embodiment

A first exemplary embodiment of the present disclosure applied to a heat pump washer dryer (laundry equipment) will be described hereinafter with reference to FIGS. 1 to 8. Referring to FIG. 6 illustrating a vertical cross sectional view of a washer dryer, exterior housing 1 contains water tub 2 which is elastically supported by a plurality of support sections 3 so as to be oriented horizontally. Water tub 2 contains rotary drum 4 provided coaxially with water tub 2. Rotary drum 4 is provided with multiplicity of dehydrate pores 4a, though only partially shown, defined on its peripheral wall and rear wall that also serve as air pores. Thus, rotary drum 4 also functions as a wash tub, a dehydrate tub, and a dry chamber. Rotary drum 4 is further provided with a plurality of baffles 4b on its inner surface, only one of which is shown for simplicity.

Exterior housing 1, water tub 2 and rotary drum 4 each have openings 5, 6, and 7 respectively at their front sides (right side as viewed in the drawings), for loading and unloading of laundry. Openings 5 and 6 establish a watertight communication through elastically deformable bellows 8. Opening 5 of exterior housing 1 is opened/closed by door 9. Rotary drum 4 is provided with rotary shaft 10 extending from its rear surface which is supported by a bearing not shown to be driven by drum motor 11. Drum motor 11 comprises an outer rotor three-phase brushless DC motor mounted on the rear exterior of water tub 2. Thus, rotary drum 4 is driven in a direct drive method by drum motor 11.

On bottom plate 1a of exterior housing 1, casing 13 is provided via a plurality of support elements 12 and casing 13 has exhaust 13a defined on its upper right end and inlet 13b on its upper left end respectively. Bottom plate 1a further has compressor 15 constituting heat pump (refrigeration cycle) 14 provided on it. Casing 13 further contains condenser 16 and evaporator 17 also constituting heat pump 14 in the listed sequence from right to left. Casing 13 further contains blower fan 18 in its right end interior. Further, provided within casing 13 is a disc-shaped water receiver 13c located below evaporator 17.

Water tub 2 has intake 19 at its upper front face and exhaust 20 at its lower rear face. Intake 19 communicates with outlet 13a of casing 13 through linear duct 21 and an extendible connection duct 22. Exhaust 20 communicates with inlet 13b of casing 13 through annular duct 23 and an extendible connection duct 24. Annular duct 23 is mounted at the rear exterior of water tub 2, so as to be co-axial with drum motor 11. That is, the entrance of annular duct 23 is connected to exhaust 20 and its exit is connected to inlet 13b through connection duct 24. Casing 13, connection duct 22, linear duct 21, intake 19, exhaust 20, annular duct 23 and connection duct 14 constitute air circulation path 25.

Exterior housing 1 further contains a three-way water valve 26 at its upper rear portion and detergent feeder 26a at its upper front portion. Water valve 26 has its water intake connected to a faucet through a supply hose for taking in tap water; its first water outlet connected to the upper water inlet of detergent feeder 26a through wash water hose 26b; and a second water outlet connected to the lower water inlet of detergent dispenser 26a through rinse water hose 26c. The water outlet of detergent feeder 26*a* is connected to supply port 2*a* defined on the upper portion of water tub 2 through water hose 26*d*.

At the bottom rear portion of water tub 2, drain section 2*b* is defined which is connected to drain hose 27 through drain valve 27*a*. A portion of drain hose 27 is configured to be extendible. Water receiver 13*c* of casing 13 is connected to an intermediate portion of drain hose 27 through drain hose 28 and check valve 28*a*.

Control panel 29 is provided on the upper front face of exterior housing 1 and includes user interfaces such as a display and various operation switches not shown. On the rear side of control panel 29, display/operation circuit board 84 is provided and control panel 29 is controlled through communication with control circuit 30 provided in circuit board case 110. Control circuit 30 is configured by a microcomputer and executes wash, rinse, and dehydrate operations through control of water valve 26, drum motor 11, and drain valve 27*a*, and executes dry operation through control of drum motor 11 and compressor motor (not shown) comprising a three phase brushless DC motor that drives compressor 15 in response to user operation of operation switches provided on control panel 29.

Figure 7A:
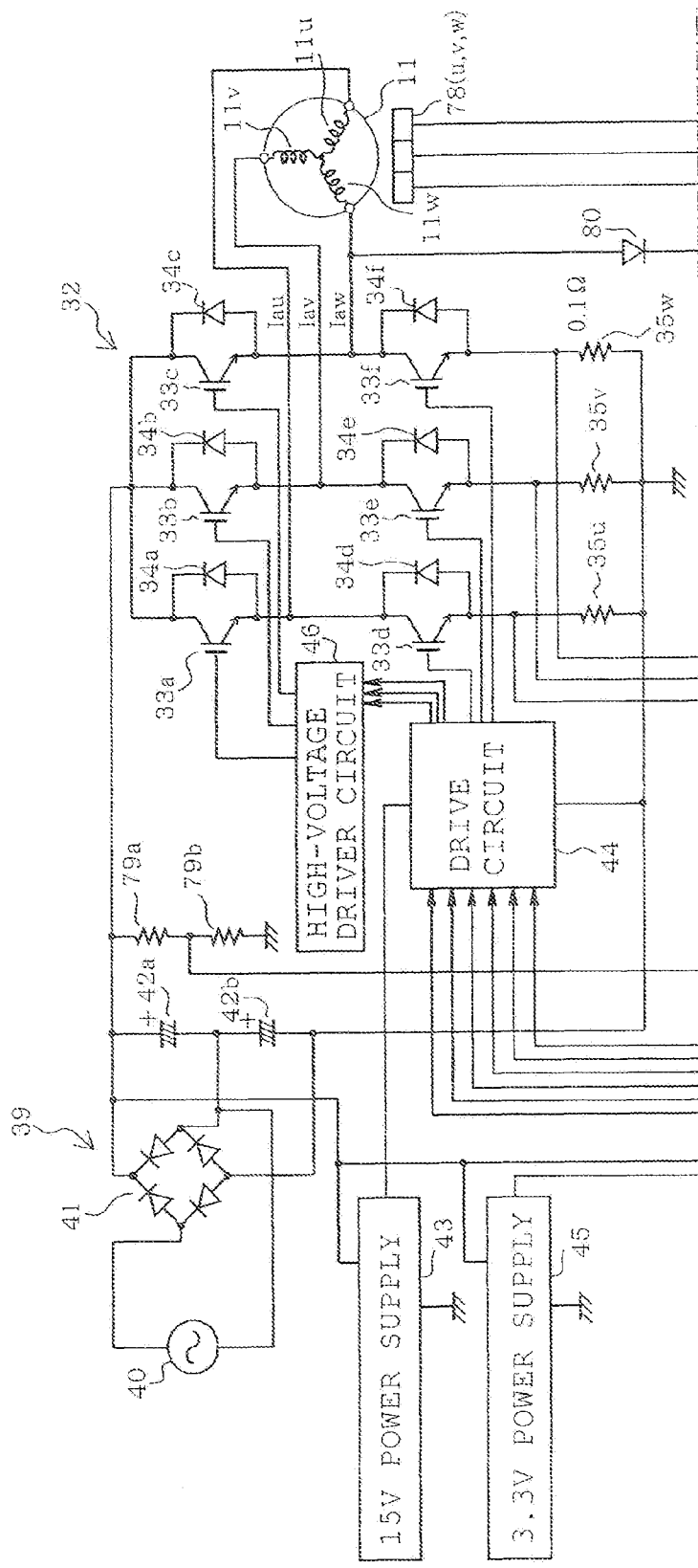
FIGS. 7A and 7B collectively referred to as FIG. 7 schematically illustrate a drive system of the drum motor.
Figure 7B:
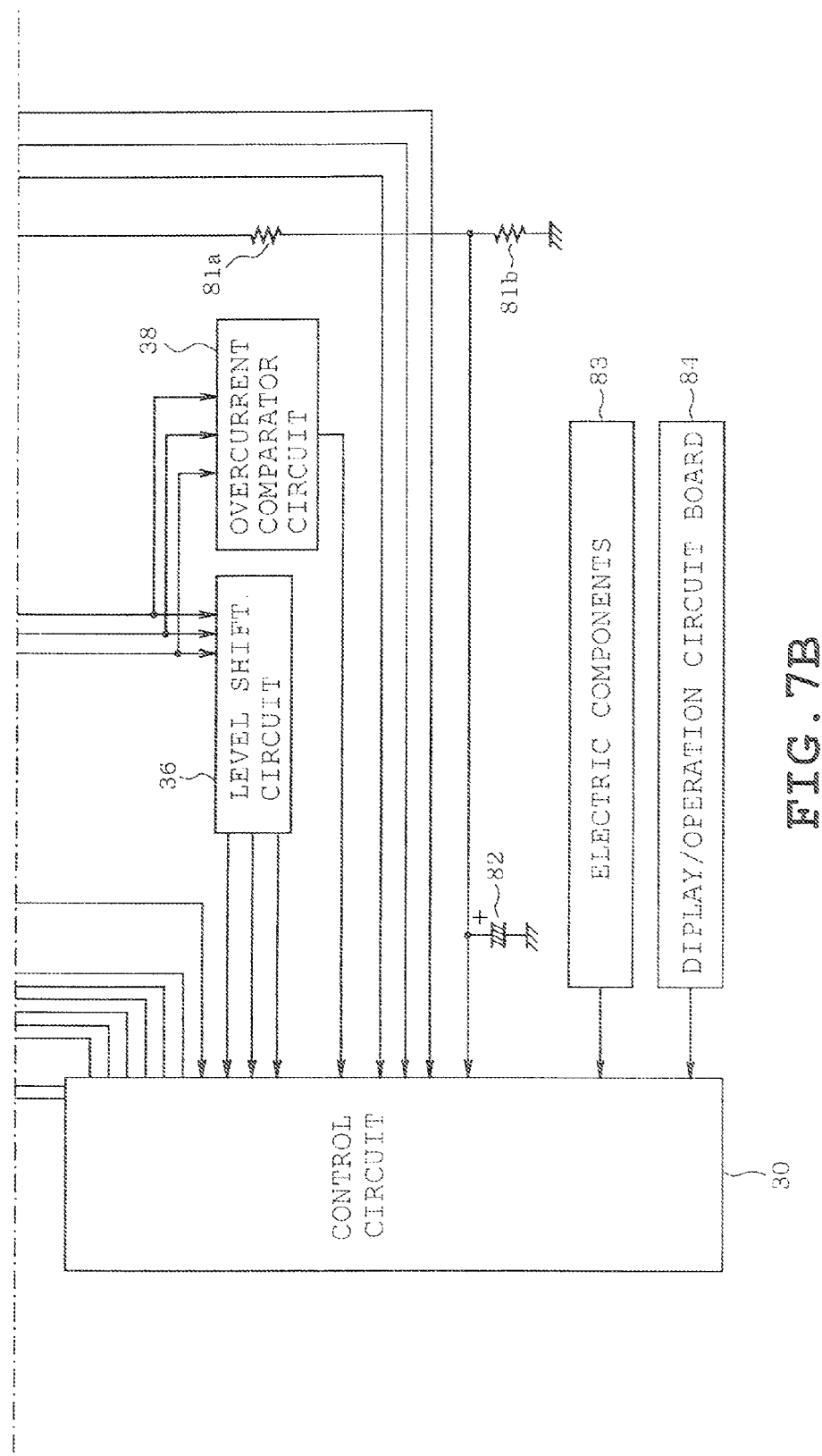

FIG. 7 schematically illustrates the drive system of drum motor 11. Inverter circuit 32 (PWM controlled inverter) is configured by a three-phase bridge connection of six semiconductor switching devices such as IGBTs (Insulated Gate Bipolar Transistor) 33*a* to 33*f*. Each of the six IGBTs 33*a* to 33*f* has one of flywheel diodes 34*a* to 34*f* connected between its collector and emitter.

Emitters of IGBTs 33*d*, 33*e*, 33*f* situated in the lower arm are grounded through shunt resistances (current detecting element) 35*u*, 35*v*, and 35*w*. The common connection point between the emitters of IGBTs 33*d*, 33*e*, and 33*f* and shunt resistances 35*u*, 35*v*, and 35*w* are connected to control circuit 30 through level shift circuit 36, respectively. Windings 11*u* to 11*w* of drum motor 11 carry maximum current flow of 15 A and thus, shunt resistances 35*u* to 35*w* are set at 0.1Ω, for example.

Level shift circuit 36 includes components such as operational amplifiers to amplify the terminal voltages of shunt resistance 35*u* to 35*w* and biases the range of output of the amplified signal so that it stays in the positive side (as in 0 to +3.3V). Overcurrent comparator circuit 38 detects overcurrent to prevent circuit breakdown when the upper or the lower aim of inverter circuit 32 is short circuited.

Inverter circuit 32 has drive power supply circuit 39 connected to its input side and drive power supply circuit 39 supplies AC power supply 40 of 100V to inverter circuit 32 after converting it into DC voltage of approximately 280V through voltage doubling rectification carried out by fullwave rectifier circuit 41 configured by a diode bridge and a couple of series connected condensers 42*a* and 42*b*. Each of the phase output terminals of inverter circuit 32 is connected to one of phase windings 11*u*, 11*v*, and 11*w* of drum motor 11.

Control circuit 30 detects current values Iau to Taw flowing in windings 11*u* to 11*w* through level shift circuit 36 and based on the detected current values, control circuit 30 produces estimate phase θ and estimate rotational angular speed ω of revolving magnetic field of the secondary side and obtains excitation current component Id and torque current component Iq by orthogonal coordinate transformation and d-q (direct-quadrature) coordinate transformation of the three phase current values.

Then, control circuit 30, when receiving a speed command from external components, produces current command Id_ref and current command Iq_ref based on estimate phase θ, estimate rotational angular speed ω, and current components Id and Iq. Then current command Id_ref and current command Iq_ref are converted into voltage commands Vd and Vq which are thereafter subjected to orthogonal coordinate transformation and three phase coordinate transformation. Finally, drive signal is produced as PWM signal to be outputted to windings 11*u* to 11*w* of drum motor 11 through inverter circuit 32.

Drive power supply of approximately 280V supplied to inverter circuit 32 is stepped down by a first power supply circuit 43 to produce a control power supply of 15V which is fed to control circuit 30 and drive circuit 44. The 15V power supply generated by the first power supply circuit 43 is utilized by a second power supply circuit 45, which is configured as a three-terminal regulator, as source for generating 3.3V power supply which is thereafter fed to control circuit 30. IGBTs 33*a* to 33*c* at the upper arm of inverter circuit 32 are driven by high-voltage driver circuit 46.

Drum motor 11 is provided with a rotational position sensor 78 (u, v, w), which is configured by a Hall IC etc., disposed at its rotor and position signals of the rotor outputted by rotational position sensor 78 (position detecting element) is given to control circuit 30. That is, during activation of motor 11, field oriented control (vector control) is executed using rotational position sensor 78 until sufficient rotational speed (30 rpm, for example) is reached that would allow estimation of rotor position, and after reaching such rotational speed, sensorless field oriented control is executed without using rotational position sensor 78.

Though not shown in detail, compressor motor is configured to be nearly symmetrical to the drive system of drum motor 11.

Power supply circuit 39 has a series circuit composed of resistor elements 79*a* and 79*b* functioning as a voltage divider circuit constituting a voltage detector provided between its output terminal and ground. Common connection point of resistor elements 79*a* and 79*b* are connected to the input terminal of control circuit 30. Control circuit 30 reads the incoming input voltages from inverter circuit 32 which have been divided by resistor elements 79*a* and 79*b*, and utilizes the read voltage as a reference for determining the PWM signal duty.

Series circuit comprising diode 80, resistor elements 81*a* and 81*b* is connected between the W phase output terminal of inverter circuit 32 and ground and condenser 82 is connected in parallel to resistor element 81*b*. Common connection point of resistor elements 81*a* and 81*b* is connected to the input terminal of control circuit 30, which control circuit 30 detects the induced voltage produced at winding 11W when motor 11 is idly rotated.

Other responsibilities of control circuit 30 includes control of electric components 83 such as a door lock control circuit and dry fan motor and exchanging inputs/outputs of operation signals and control signals, etc. with display/operation circuit board 84.

Figure 8A:
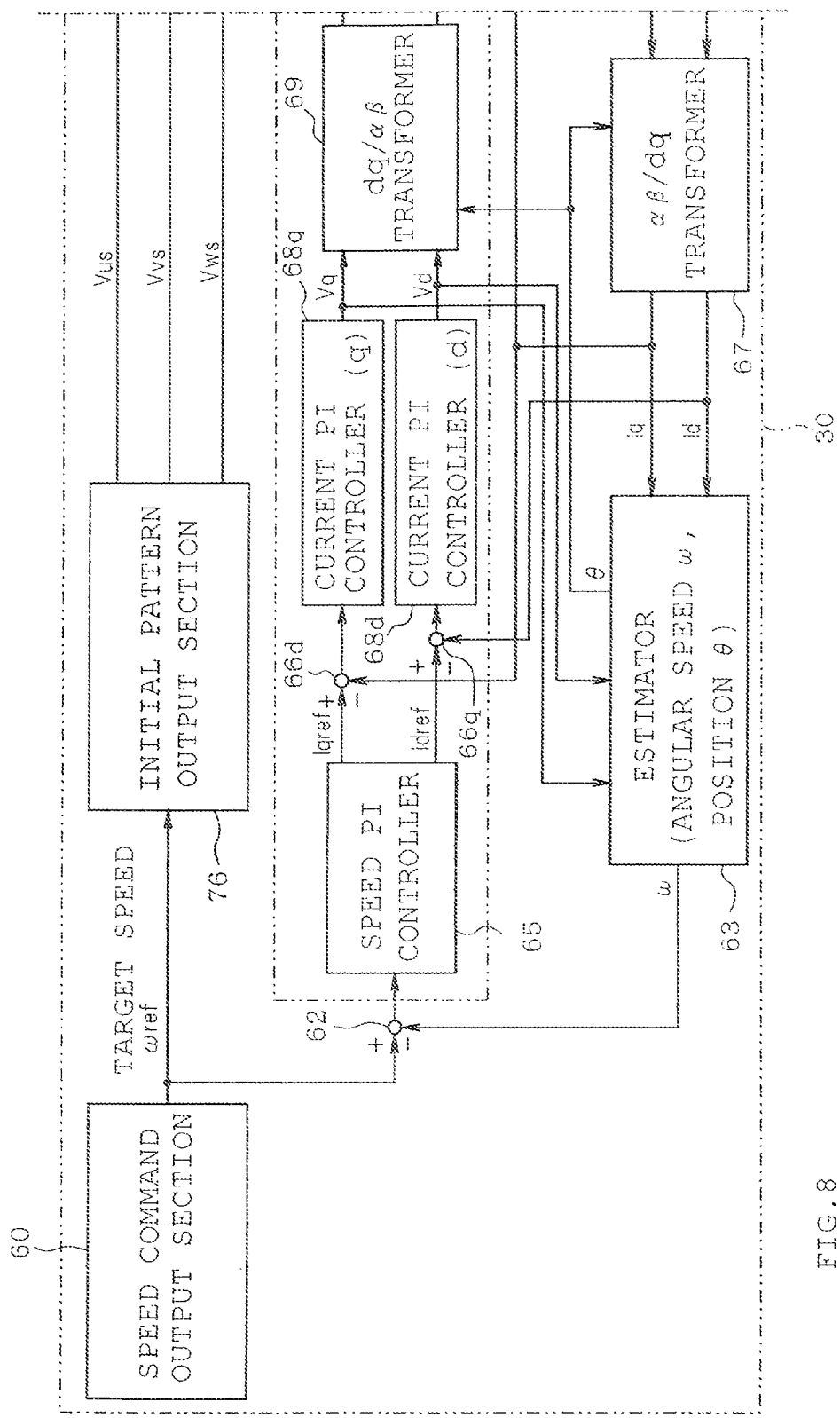
FIGS. 8A and 8B collectively referred to as FIG. 8 are functional block diagrams of a sensorless field oriented control executed on the drum motor.
Figure 8B:
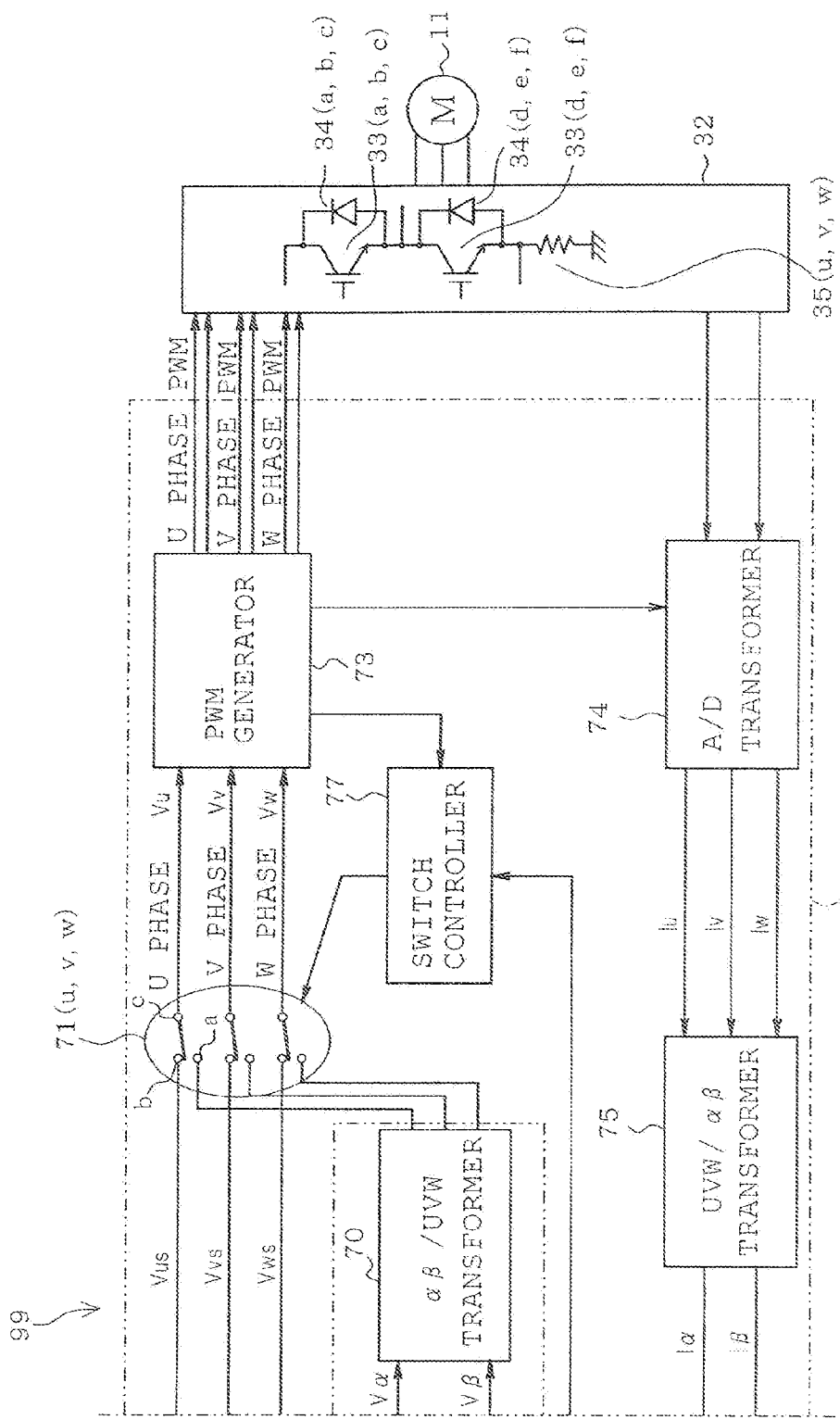

FIG. 8 is a functional block diagram of sensorless field oriented control executed on drum motor 11 (and compressor motor) by control circuit 30. The illustrated configuration is similar to those disclosed in, for instance, JP-2003-181187 A and will only be briefly described. In FIG. 8, (α, β) represents an orthogonal coordinate system which is the result of orthogonal transformation of three phase (UVW) coordinate system, corresponding to each phase of motor 11, mutually displaced by 120 degrees in electric angle, whereas (d, q) represents a secondary coordinate system that rotates with the rotor rotation of motor 11.

Target speed command ωref outputted by speed output section 60 is given to subtractor 62 as a minuend, whereas speed estimate ω of drum motor 11 estimated by estimator 63 is given to subtractor 62 as the subtrahend. The difference produced by subtractor 62 is given to speed PI (Proportional Integral) controller 65. Speed PI controller 65 performs PI control based on the difference of target speed command coref and speed estimate ω to produce q-axis current command Iq_ref and d-axis current command Id_ref. Command Iq_ref and Id_ref are given to subtractors 66q and 66d as minuends and q-axis current Iq and d-axis current Id outputted from αβ/dq transformer 67 are given as subtrahends. The difference produced by subtractors 66q and 66d are respectively given to to current PI controllers 68q and 68d, respectively. The control period at speed PI controller 65 is set at 1 m second.

Current PI controllers 68q and 68d perform PI control based on the difference between q-axis current command Iq_ref and d-axis current command Id_ref to generate q-axis voltage command Vq and d-axis voltage command Vd which are outputted to dq/αβ transformer 69. Rotational phase angle (rotor position angle) θ of secondary magnetic flux estimated by estimator 63 is given to dq/αβ transformer 69, and dq/αβ transformer 69 in turn converts voltage commands Vd and Vq into voltage commands Vα and Vβ based on rotational phase angle θ.

Voltage commands Vα and Vβ are converted into three-phase voltage commands Vu, Vv, and Vw by αβ/UVW transformer 70 and thereafter outputted to be given to one side of the stationary connection points 71ua, 71va, and 71wa of switches 71u, 71v, and 71w, whereas the stationary connection points 71ub, 71vb, and 71wb in the remaining other side are provided with voltage commands Vus, Vvs, and Vws outputted from initial pattern output section 76. Movable connection points 71uc, 71vc, and 71wc of switches 71u, 71v, and 71w are connected to the input terminal of PWM generator 73.

A/D converter 74 outputs A/D converted current data Iau, Iav, and Iaw occurring at IGBTs 33d to 33f to UVW/αβ transformer 75. UVW/αβ transformer 75 transforms three phase current data Iau, Iav, and Iaw into dual axis current data Iα and Iβ of orthogonal coordinate system according to a predetermined formula. The dual axis current data Iα and Iβ are outputted to αβ/dq transformer 67.

Estimator 63 produces estimate position angle θ and estimate rotational speed ω of rotor of drum motor 11 based on q-axis voltage command Vq, d-axis voltage command Vd, q-axis current Iq, and d-axis current Id and outputs the estimates to the required components. During startup, drum motor 11, being applied with startup pattern by initial pattern output section 76, is forcibly commutated. Then, after field oriented control has been initiated based on sensor signals of rotational position sensor 78, estimator 63 is started 8 to proceed to sensorless field oriented control in which obtains estimates of position angle θ and rotational speed ω of rotor of drum motor 11. In the case of compressor motor, transition is made to sensorless.

Switch controller 77 controls the switching performed at switches 71 based on duty information of a PWM signal given by PWM generator 73. The above described configurations implemented as software at control circuit 30 with the exception of inverter circuit 32 have been represented as a block diagram. Current control period in the field oriented control is set at 128μ seconds. PWM carrier wave period is 64μ, seconds at drum motor 11 and 128μ seconds at compressor motor. Control circuit 30 and inverter circuit 32 constitute inverter device 99.

Figure 5:
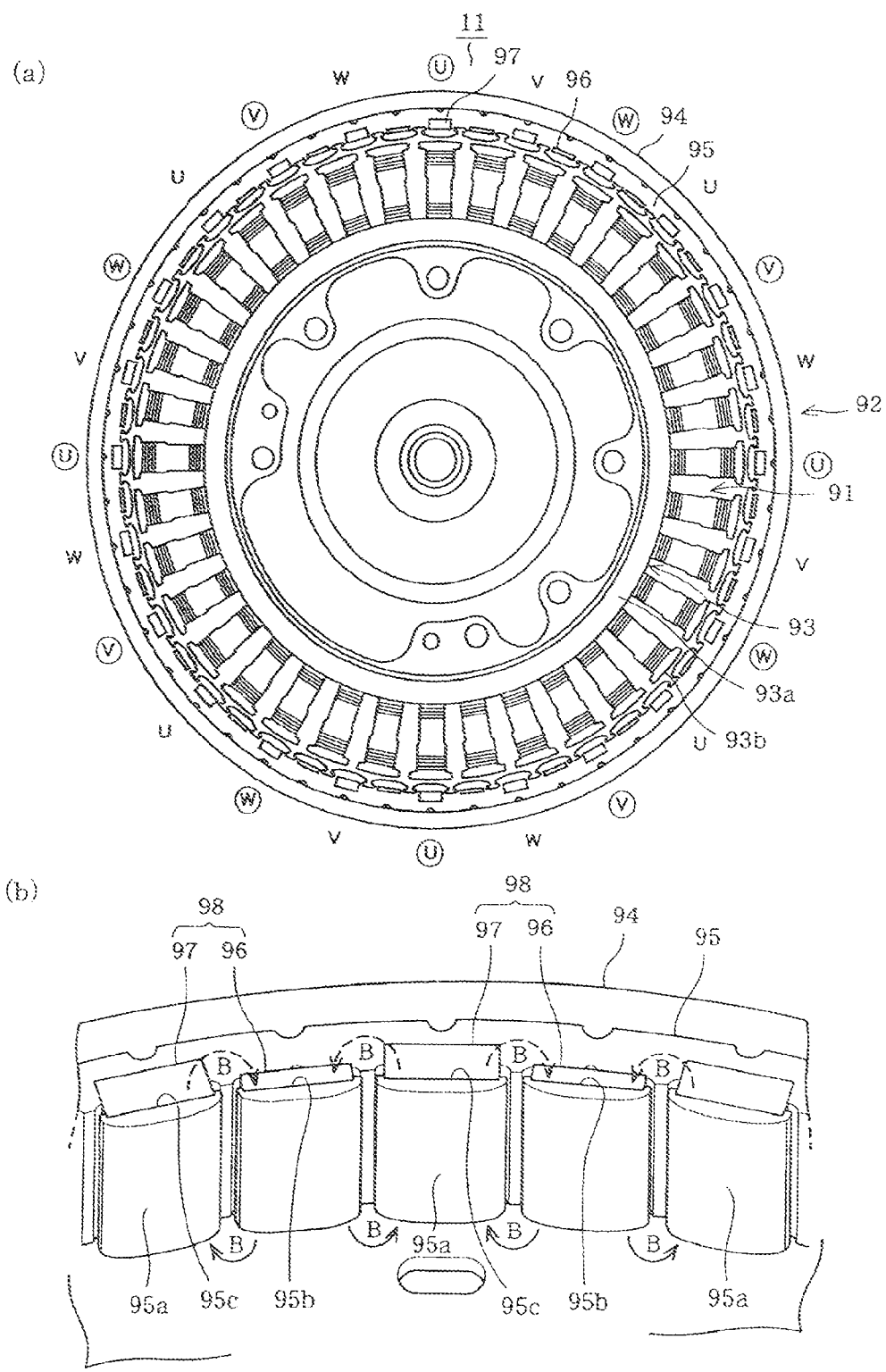
FIG. 5 provides a plan view in (a) that schematically illustrates the overall configuration of a drum motor, and a partially enlarged perspective view of the rotor in (b)
Figure 6:
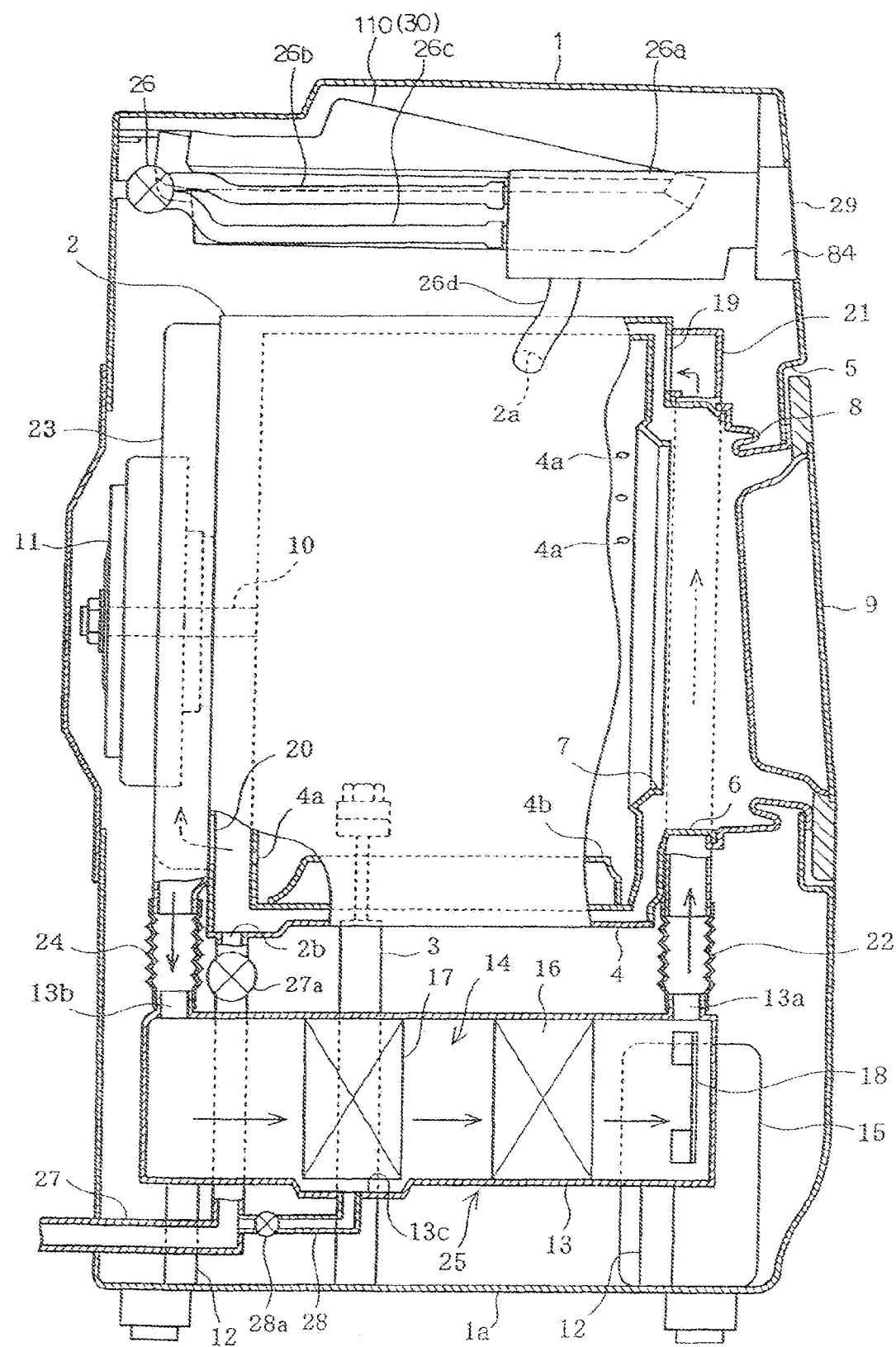
FIG. 6 is a vertical cross sectional side view of a washer/dryer.

FIG. 5 provides a plan view in (a) that schematically illustrates the overall configuration of a drum motor 11, and a partially enlarged perspective view in (b). Drum motor 11 includes stator 91 and rotor 92 provided at the outer periphery of stator 91. Stator 91 comprises stator core 93 and stator windings 11u, 11v, and 11w. Stator core 93 is made of annular yoke 93a and a multiplicity of teeth 93b extending radially from the outer periphery of yoke 93a and stator windings 11u, 11v, and 11w are wound on teeth 93b.

Rotor 92 is integrally structured by frame 94, rotor core 95, and a plurality of permanent magnets 96 and 97 molded together by a mold resin not shown. Frame 94 is made of magnetic material such as a steel sheet pressed into a form of a flat bottom cylinder. Permanent magnets 96 and 97 constitute rotor magnet 98.

Rotor core 95 is disposed on the inner periphery of frame 94 and the inner peripheral surface of rotor core 95 which confronts the outer peripheral surface is contoured by a plurality of protrusions 95a protruding inward and in arch shape. Protrusions 95a have rectangular insert holes 95b and 95c defined in them that differ in the widths of their shorter sides and that run in the axial direction so as to penetrate protrusions 95a. Insert holes 95b and 95c are disposed alternately in an annular arrangement. Each of insert holes 95b and 95c have neodymium magnet 96 (a first permanent magnet) and alnico magnet 97 (a second permanent magnet) inserted in them, respectively.

The coercivity of neodymium magnet 96 is approximately 900 kA/m which is as much as nine times the coercivity of alnico magnet 97 which is approximately 100 kA/m.

Further, the two types of permanent magnets 96 and 97 each represent a single magnetic pole and are each disposed so that their direction of magnetism is oriented along the radial direction of permanent magnet motor 1. Both permanent magnets 96 and 97 are provided in a set of 24 magnets to amount to a total of 48 magnets. Because the two types of permanent magnets 96 and 97 are disposed alternately and oriented such that their direction of magnetism are oriented along the radial direction, the magnetic poles of the permanent magnets 96 and 97 disposed adjacent to the other reside in opposite directions (meaning that the north pole of either of the magnet types resides in the inner side whereas the north pole of the remaining other magnet type resides in the outer side), a path of magnetism (magnetic flux) is produced between neodymium magnets 96 and alnico magnets 97 in the direction, for example, indicated by arrow B. This means that magnetic path is formed so as to pass through both neodymium magnets 96 having relatively greater coercivity and alnico magnets 97 having relatively less coercivity.

Next, working of the present exemplary embodiment will be described with reference to FIGS. 1 to 4. FIG. 4 indicates full automatic operation of a general washing machine and the horizontal axis represents the elapsed time (minutes) and the vertical axis represents the count of rotation (rpm) of drum motor 11. The above described machine configuration assumes a washer dryer configuration; however, the dry operation will not be explained for simplicity.

Among the steps shown, the steps that involve drastic variation in rotation count of drum motor 11 are: (B) wash step, (E) rinse/dehydrate (1) step, (G) rinse/agitate (1) step, (J) rinse/dehydrate (2) step, (L) rinse/agitate (2) step, and (O) final dehydrate step. Maximum rotation count of drum 11 is around 50 rpm in steps (B), (G), and (L); around 1300 rpm in steps (E) and (J); and around 800 rpm in step (O). Output torque of motor 11 is around 280 kgf·cm in steps (B), (G), and (L); and around 20 to 30 kgf·cm in steps (E) and (J). Thus, steps (B), (G), and (L) operate under low-speed rotation/high-output torque, whereas steps (E) and (J) operate under high-speed rotation/low-output torque.

When the washer dryer executes the so called "preheat dehydration" in which laundry inside rotary drum 4 is dehydrated while being heated, motor 11 is controlled as in steps (E) and (J).

In conventional washing machines, further escalation in rotation count when running under high-speed rotation/low-output torque was achieved by executing a field weakening control. As opposed to this, the present exemplary embodiment dynamically varies magnetic flux of rotor magnet 98 to adapt the properties of motor 11 to the properties required in given operations of the washing machine.

To elaborate, the magnetic flux of rotor magnet 98 in its entirety is increased to increase the amount of magnetization (magnetize) of alnico magnet 97 when motor 11 needs to run under low-speed rotation/high-output torque in operations such as wash/rinse operation. The magnetic flux of rotor magnet 98 in its entirety is decreased to decrease the amount of magnetization (demagnetize) of alnico magnet 97 when motor 11 needs to run under high-speed rotation/low-output torque in operations such as dehydrate operation.

A description will be given hereinunder on the process of varying the amount of magnetism of alnico magnet 97. FIG. 1 shows a flowchart (a) indicating the process flow for magnetizing a demagnetized alnico magnet 97 when proceeding from the dehydrate operation to the wash/rinse operation. Braking is started (step S1) to stop the rotation of rotary drum 4/drum motor 11 in the ongoing dehydrate operation, and when stopped (step S2: YES), d-axis current is outputted to magnetize alnico magnet 97 (step S3). The applied d-axis current causes the rotational position of rotor 92 to be fixed. From such state, conduction phase is switched (step S4) to move rotor 92 by 1 electric angle (1/24 of machine angle) and d-axis current is outputted again thereafter (step S5) to complete the process flow.

As can be seen in FIG. 5, alnico magnet 97 has U, V, and W phases aligned repeatedly in the listed sequence in the clockwise direction, and when rotor 92 is located based on the topmost U-phase, for example, every other alnico magnet 97 confronts teeth 93b of stator 91 at phases U, W, V, U, W, V . . . . Thus, at step S3, every other alnico magnet 97 is magnetized, rendering the magnetization of other half of the magnets incomplete. Thus, at step S4, after rotor 92 travels by 1 electric angle, the remaining alnico magnets 97 can be magnetized to a sufficient level.

Figure 2:
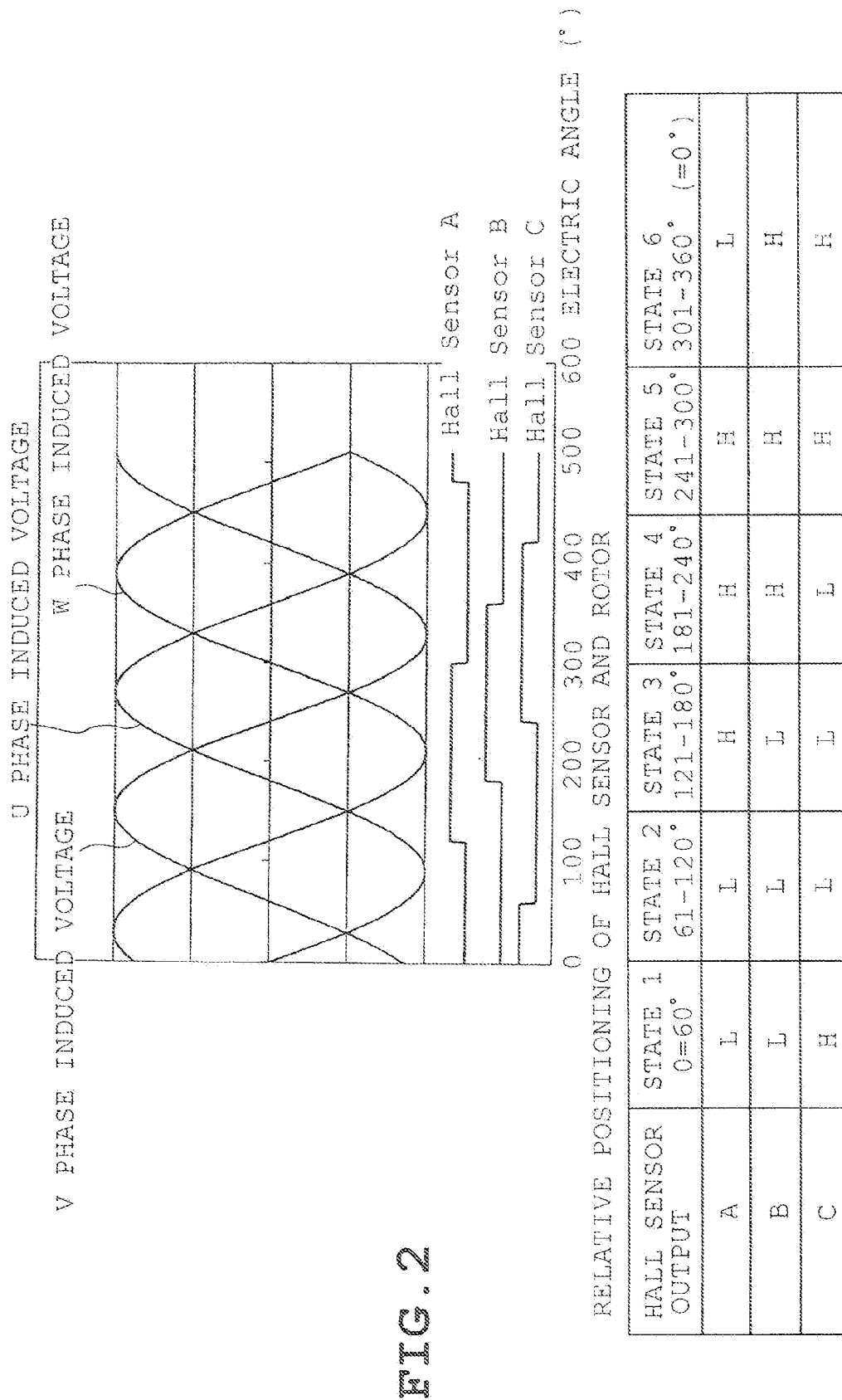
FIG. 2 indicates the relation between the stop position of the rotor and output levels of each signal outputted from a rotational position sensor.

Further, at step S3, before executing the first set of magnetization through generation of d-axis current, the position of the stopped rotor 92 is sensed by rotational position sensor 78 and conduction phase is determined based on the stopped position. As shown in FIG. 2, output levels of signals A, B, and C produced by rotational position sensors (Hall sensors) 78u, 78v, and 78w takes 6 different states at each of the 60-degree electric angle intervals depending upon the position of rotor 92. Thus, by giving d-axis current at conduction phases corresponding to the output levels of sensor signals A, B, and C and fixing the position of rotor 92 at 30, 90, 150, 210, 270, and 330 degrees, the amount of rotation movement of rotor 92 can be reduced to suppress noise emission. Because the washing machine is generally installed indoors, noise reduction is a significant requirement.

FIG. 1 shows flowchart (b) indicating the process flow of demagnetization upon transition to the dehydrate operation from the wash/rinse operation carried out under the magnetized state. The steps of the process flow are basically the same as those of flowchart (a) except that steps S8 and S10 corresponding to steps S3 and S5 are labeled "OUTPUT Demagnetizing Current".

When classified by drive patterns (rotation speed, output torque) of drum motor 11, the operation steps of the washing machine indicated in FIG. 4 can be categorized into the following 3 patterns.

First pattern: steps (B), (G), and (L)
Second Pattern: step (O)
Third Pattern: steps (E) and (J)

In the first pattern in which the highest output torque is required, alnico magnet 97 is magnetized at the maximum level whereas in the second pattern, alnico magnet 97 is slightly reduced in the level of magnetism of the first pattern, and in the third pattern in which the highest rotation count is required, alnico magnet 97 is demagnetized at the maximum level to reduce the magnetism of alnico magnet 97 as much as possible. Results of simulation based on the configuration illustrated in FIG. 5 showed that field magnetism of rotor 92, in other words, the magnetic flux of rotor magnet 98 could be reduced by 30% from the fully magnetized state.

Figure 3:
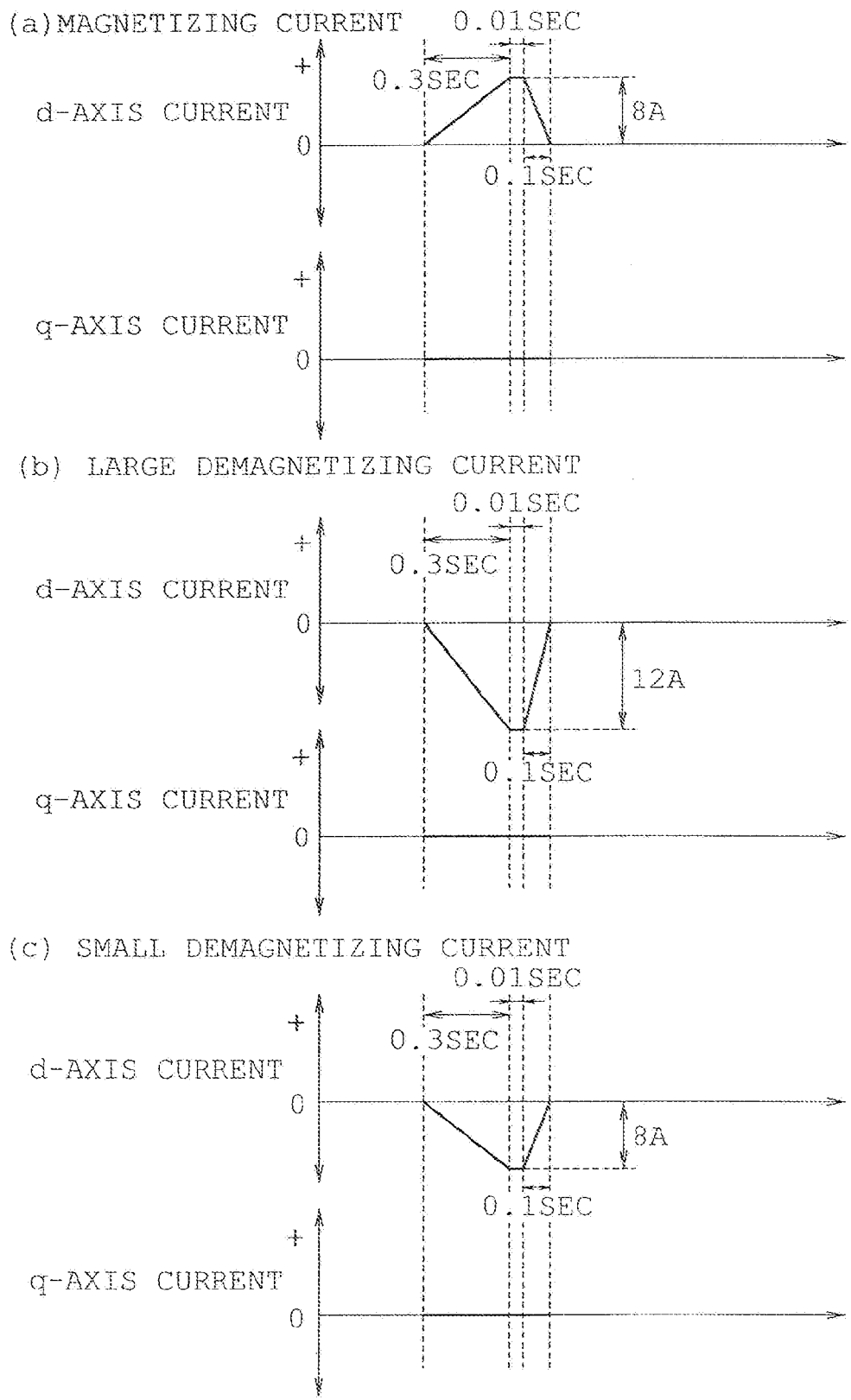
FIG. 3 shows d-axis output patterns for: (a) maximizing the magnetization of the alnico magnet, (b) maximizing the demagnetization, and (c) executing a relatively small level of demagnetization.
Figure 4B:
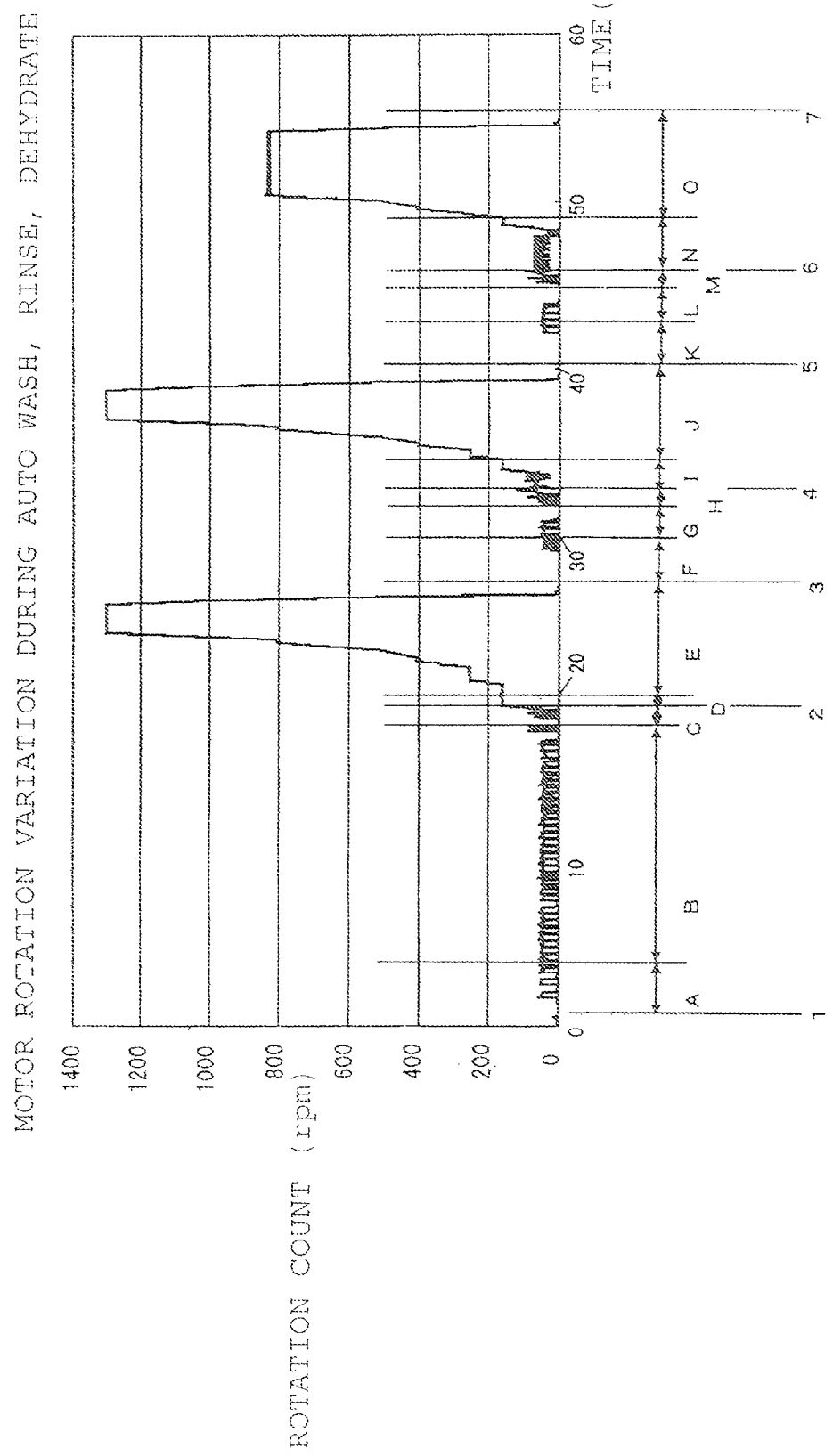

FIG. 3 shows how d-axis current s outputted when magnetization is executed at steps S3 and S5 of FIG. 1 and when executing demagnetization at steps S8 and S10, respectively where: chart (a) shows alnico magnet 97 being magnetized at the maximum level (the first pattern); chart (b) shows alnico magnet 97 being demagnetized at the maximum level (the third pattern); and chart (c) shows alnico magnet 97 being magnetized at a relatively small level (the second pattern). In either case, q-axis current is set to "0".

In the case of chart (a) of FIG. 3, the level of d-axis current is raised in the (+) direction from 0 A to 8 A in 0.3 seconds and maintains such state for 0.01 second whereafter the current level returns to 0 A from 8 A in 0.1 second. In the case of demagnetization represented by chart (b) of FIG. 3, the level of d-axis current is raised in the (−) direction to 12 A whereas in the case of chart (c) of FIG. 3, negative d-axis current peaks at 8 A. Thus, by gradually increasing/decreasing d-axis current in an appropriate slope, noise can be suppressed during magnetization and demagnetization.

According to the exemplary embodiment described above, rotor magnet 98 comprising neodymium magnets 96 and alnico magnets 97 has been provided at rotor 92 of drum motor 11, and control circuit 30 of inverter device 99 is configured to vary the amount of magnetization of alnico magnet 97 by producing d-axis current to execute the dehydrate operation by increasing the magnetic flux of rotor magnet 98 and the wash/rinse operation by decreasing the magnetic flux of rotor magnet 98.

Because the dehydrate operation requiring high-speed rotation and low-output torque can be executed without having to execute a field weakening control necessitated in the conventional configuration and without increasing motor current, drum motor 11 can be driven more, efficiently to allow the washing machine to run with less electricity consumption. Further because sufficient wash/rinse operation and dehydrate operation can be executed with a relatively compact drum motor 11, rotary drum 4 can be increased in volume. Yet further, because high-speed rotation can be executed with relatively greater range of weakened magnetic flux, motor efficiency of low speed rotation can be enhanced as well by increasing the number of turns of windings 11u to 11w and through use of permanent magnets of relatively higher magnetism to provide greater range of rotation count.

Because the amount of magnetization of alnico magnet 97 is varied after the rotation of drum motor 11 has been stopped, relatively less voltage can be applied on motor 11 with no induced voltage being produced at windings 11u to 11w to allow downsizing of inverter circuit 32. Further, noise emission can be suppressed when varying the amount of magnetism.

Because control circuit 30 switches the conduction phase of d-axis current for varying the amount of magnetism depending on the position where the rotation of rotor 92 is stopped detected by rotation position sensor 78, amount of movement of rotor 92 can be minimized to further suppress noise emission.

Still further, because the level of increase/decrease in magnetism of alnico magnet 97 is controlled based on the maximum rotation count allocated for each operation step, the magnetic flux of rotor magnet 98 can be optimized to yield greater efficiency when the washing machine executes multiple dehydrate operations differing in the maximum rotation count such as rinse/dehydrate step and the final dehydration step. Further, because control circuit 30 gradually increases the level of d-axis current in varying the amount of magnetism, noise emission can be suppressed even more effectively.

Second Exemplary Embodiment

Figure 9:
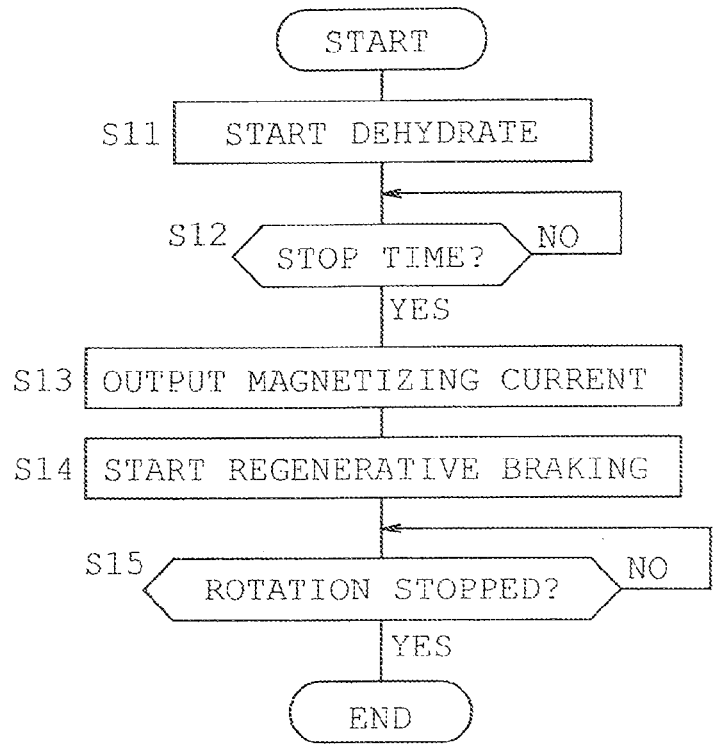
FIG. 9 is a flowchart indicating the process flow of magnetization executed immediately before execution of a braking operation for terminating the dehydrate operation according to a second exemplary embodiment of the present disclosure.
Figure 10:
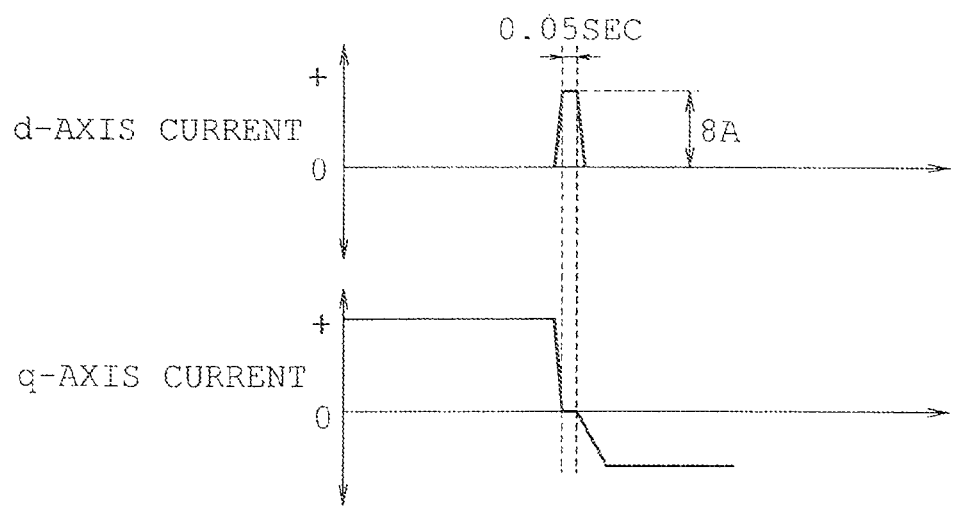
FIG. 10 corresponds to (a) of FIG. 3 representing the process executed in FIG. 9.

FIGS. 9 and 10 illustrate a second exemplary embodiment of the present disclosure and portions that are identical to the first exemplary embodiment are identified with identical reference symbols and description is only given on portions that differ. The second exemplary embodiment is basically the same as the first exemplary embodiment but is different in that when increasing the magnetic flux of rotor magnet 98, magnetization of alnico magnet is executed immediately before executing the braking for stopping the rotation of rotary drum 4.

In the flowchart shown in FIG. 9, when completing the dehydrate operation (step S12: YES) after it has been started (step S11), control circuit 30 executes magnetization of alnico magnet 97 (step S13). At this instance, it can be appreciate from the output timing chart of d-axis current and q-axis current indicated in FIG. 10 that q-axis current which was outputted in the (+) direction during the dehydrate operation is reduced to "0" and at the same time, 8A of d-axis current is outputted for 0.05 seconds to magnetize alnico magnet 97. Upon completion of magnetization, q-axis current is outputted in the (−) direction to start regenerative braking (step S14) and the system thereafter stands by until the rotation of drum motor 11 stops (step S15: NO).

As described above, according to the second exemplary embodiment, the amount of magnetism of alnico magnet 97 is increased when executing the braking operation for terminating the dehydrate operation, thus, greater braking force is exerted to bring rotary drum 4/drum motor 11 to a stop at a shorter period of time to reduce the duration of operation. In this case, alnico magnet 97 is magnetized during the rotation of drum motor 11, however, since the level of induced voltage being produced at drum motor 11 is lower than those of, for instance, patent publication 2 and thus, magnetization can be executed without difficulty. Because the level of noise produced during the dehydrate operation is relatively high, the noise emitted in producing d-axis current in pulses during magnetization is masked by the background noise.

Third Exemplary Embodiment

Figure 11:
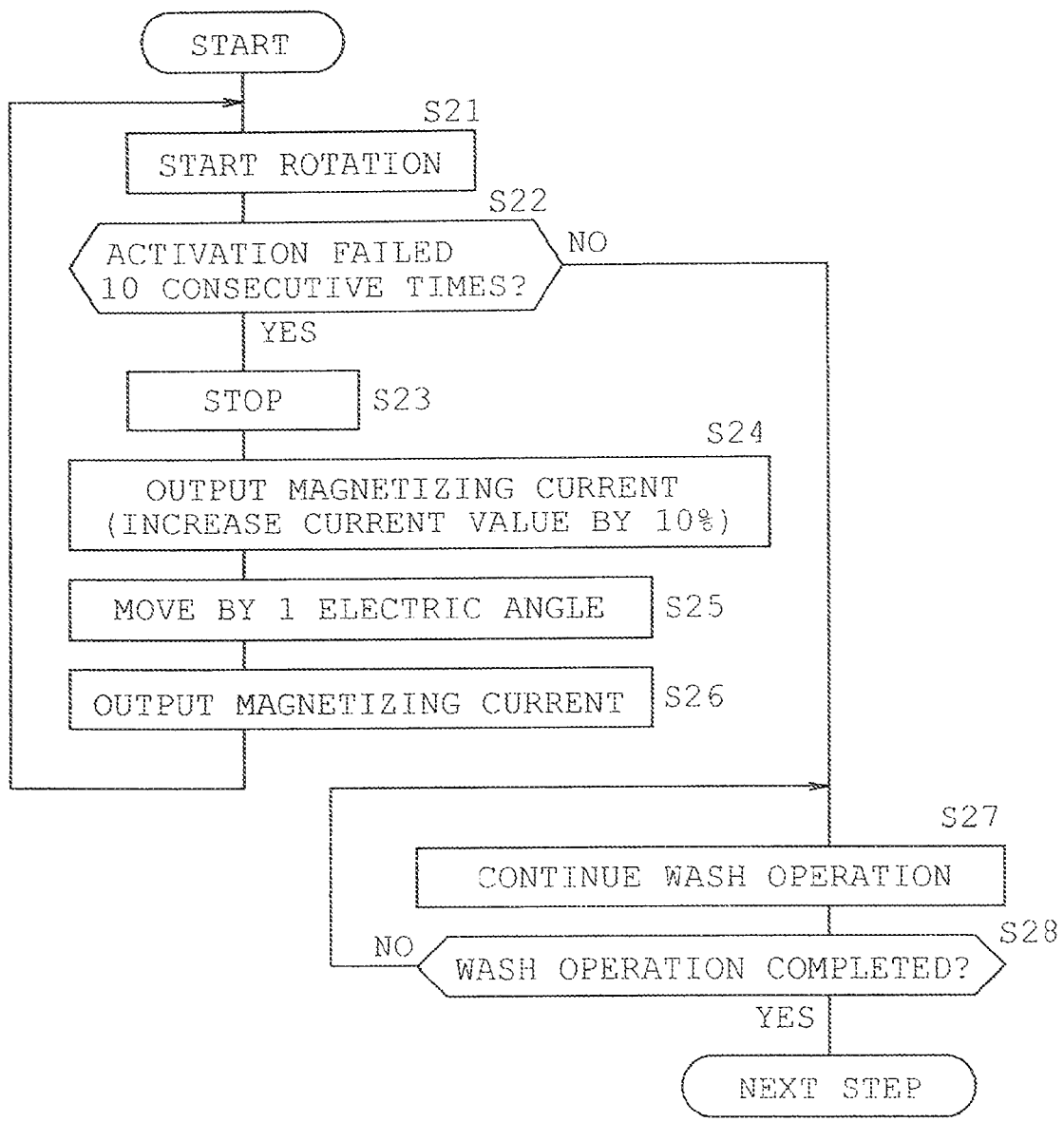
FIG. 11 is a flowchart indicating the process flow of re-magnetization executed upon activation failure of the drum motor according to a third exemplary embodiment of the present disclosure.

FIG. 11 illustrates the third exemplary embodiment and a description will only be given on portions that differ from the first exemplary embodiment. In the third exemplary embodiment, if the count of rotation of drum motor 11 in the wash operation, for instance, does not meet the count of rotation required in the wash operation, the magnetization of alnico magnet 97 is deemed to be improper, and the system proceeds to redo the magnetization process.

Referring to the flowchart indicated in FIG. 11, after the wash operation (or the rinse operation) has been started (step S21), if the count of rotation of drum motor 11 reaches the maximum rotation count of, for instance, 50 rpm, activation is deemed to be successful, whereas when 50 rpm is not reached, activation is deemed to have failed (step S22). After failure judgment has been made at step S22, activation is redone for maximum of 10 times and if activation succeeds in the redo attempts (NO), the wash operation is undertaken until the end of scheduled wash time (step S27 and S28).

On the other hand, when activation of drum motor 11 has failed for 10 consecutive times at step S22 (YES), the rotation of motor 11 is stopped (step S23), and alnico magnet 97 is magnetized (step S24) as similarly done in steps S3 to S5 indicated in the flowchart (a) of FIG. 1. Of note is that the magnetization in this case is executed with the level of current increased by 10% as compared to the previous attempt of magnetization. Then, the process returns to step S21 to continue with the wash operation.

According to the above described third exemplary embodiment, during the wash or rinse operation, if the count of rotation required in the relevant operation cannot be obtained, the process for increasing the magnetism of alnico magnet 97 is re-executed. Thus, even if displacement occurs in the conduction angle while drum motor 11 is running and alnico magnet 97 is demagnetized, resulting in a failure to obtain the required torque, the ongoing operation can be continued through re-magnetization.

Fourth Exemplary Embodiment

Figure 12:
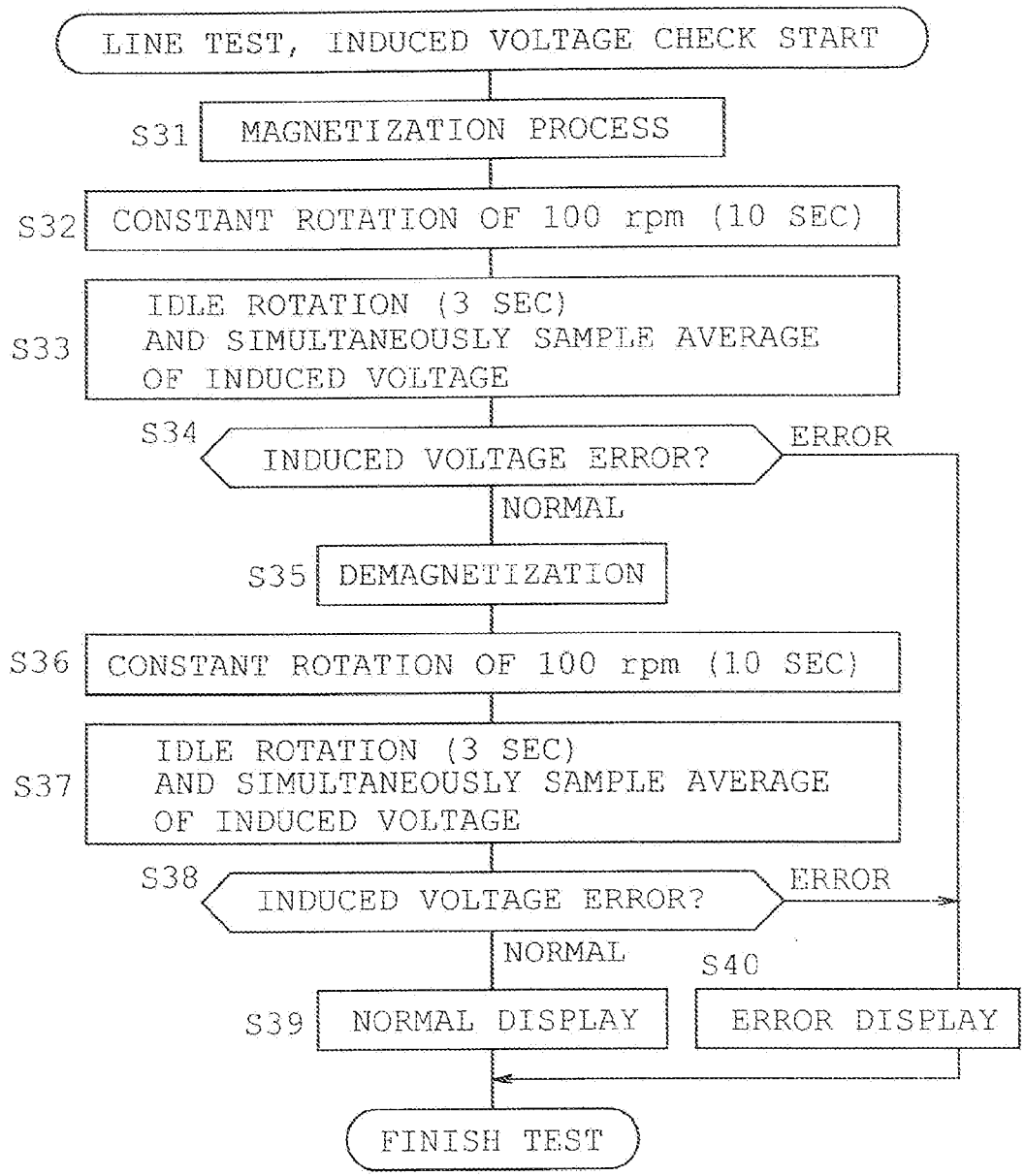
FIG. 12 is a flowchart indicating the process flow for evaluating whether or not variation in the amount of alnico magnet is reliably carried out according to a fourth exemplary embodiment of the present disclosure.

FIG. 12 illustrates the fourth exemplary embodiment in which evaluation is made in the assembly line of the washing machine as to whether or not the amount of magnetism has been successfully varied. First, alnico magnet 97 is magnetized (step S31) and drum motor 11 is rotated at constant speed of, for instance, 100 rpm for 10 seconds (step S32). Then, drum motor 11 is idly rotated for 3 seconds for sampling an average induced voltage (step S33). More specifically, control circuit 30 (magnetism evaluation element) reads the A/D converted terminal voltage of condenser 82.

Then at steps S33, evaluation is made as to whether or not the sampled induced voltage is abnormal (step S34). If the induced voltage is produced in the level corresponding to the magnetized alnico magnet 97, the induced voltage is evaluated as normal, whereas if the induced voltage is produced only in a small level, the induced voltage is evaluated as abnormal. If the result of evaluation is normal, the process proceeds to step S35 to demagnetize alnico magnet 97, whereas if the result of evaluation is abnormal, the process proceeds to step S40 and error is notified on the display of control panel 29.

Steps similar to S32 to S34 are carried out in the subsequent steps S36 to S38 for demagnetization as well. However, at step S34, normal evaluation is made when the induced voltage is produced in the level corresponding to the demagnetized alnico magnet 97, whereas abnormal evaluation is made when the induced voltage is produced in the level as high as the magnetized alnico magnet 97. If the result of evaluation is normal, the process proceeds to step S39 and displays a notification on the display of control panel 29 indicating that the result of evaluation is normal and if the result of evaluation is abnormal, the process proceeds to step S40.

According to the fourth exemplary embodiment described above, control circuit 30 is allowed to test the functional normality/abnormality prior to shipment of the washing machine since evaluation is made as to whether or not magnetism of alnico magnet 97 is appropriately controlled based on the level of induced voltage produced when drum motor 11 is idly rotated at a predetermined rotation speed.

Fifth Exemplary Embodiment

Figure 13:
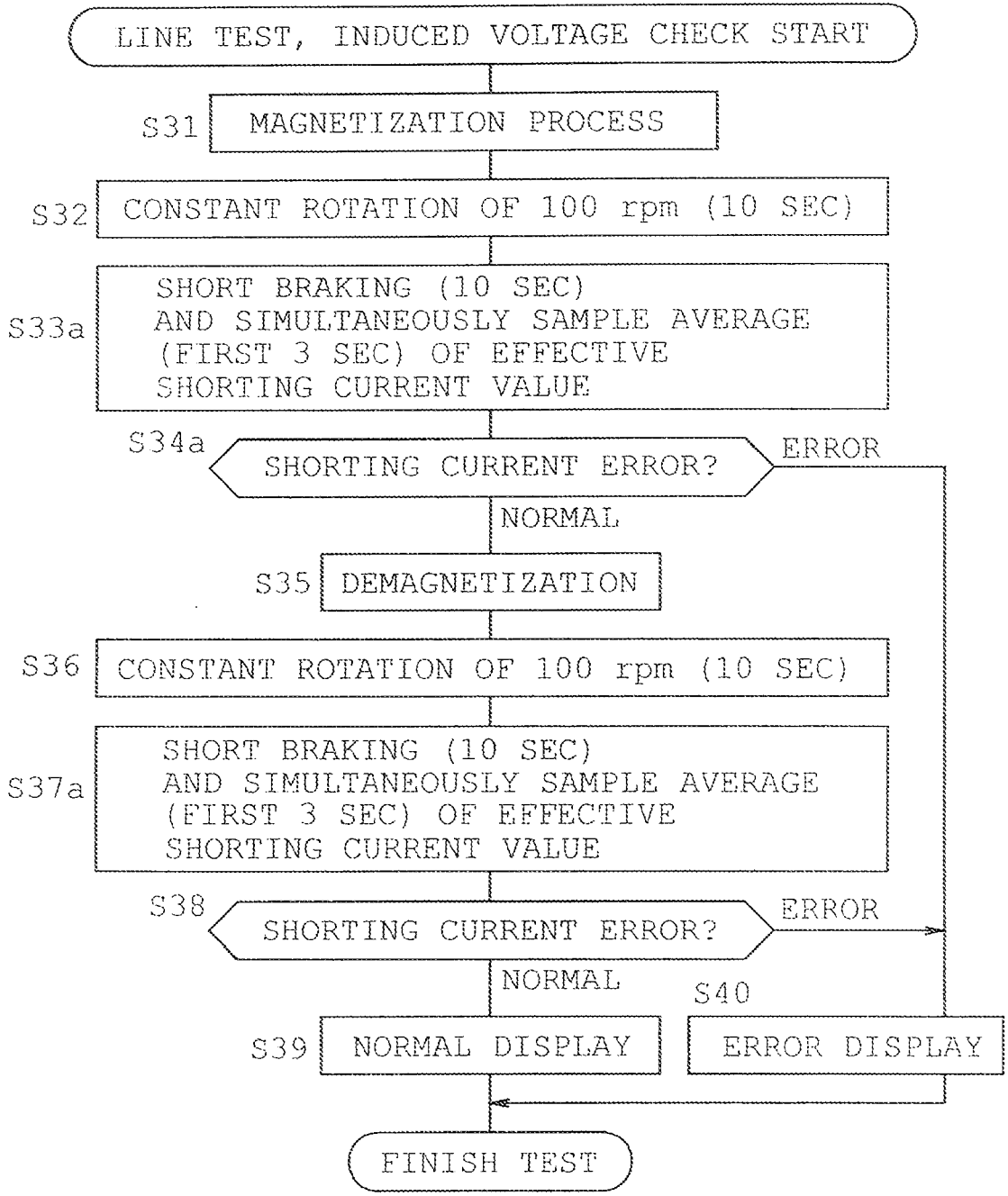
FIG. 13 corresponds to FIG. 12 and illustrates a fifth exemplary embodiment of the present disclosure.

FIG. 13 illustrates the fifth exemplary embodiment of the present disclosure and description, will be given on portions that differ from the fourth exemplary embodiment. The fifth exemplary embodiment evaluates whether or not the amount of magnetism of alnico magnet 97 is successfully varied as in the fourth exemplary embodiment based on the level of shorting current flowing in windings 11u to 11w produced by short braking instead of induced voltage.

At step S33a, short braking is applied on drum motor 11 for 10 seconds and the shorting current obtained in the first 3 seconds is sampled to obtain an average of the effective value of shorting current (synthesized vector of d-axis current and q-axis current). Then at the subsequent step S34a, normal evaluation is made if the average shorting current is at the level corresponding to the magnetized alnico magnet 97, whereas abnormal evaluation is made if only a small level of shorting current is produced. If the result of evaluation is normal, the process proceeds to step S35, whereas if the result of evaluation is abnormal, the process proceeds to step S40. Demagnetization is similarly evaluated for its normality and abnormality in steps S37a and S38a depending upon whether or not shorting current is produced at the level corresponding to the demagnetized state.

According to the above described fifth exemplary embodiment, control circuit 30 evaluates whether or not alnico magnet 97 is appropriately controlled by the level of shorting current produced when short braking is applied on drum motor 11 being idly rotated at a predetermined rotation speed, and thus, variability in magnetism can be tested without having to use devices 80 to 82 for detecting the level of induced voltage.

Sixth Exemplary Embodiment

Figure 14:
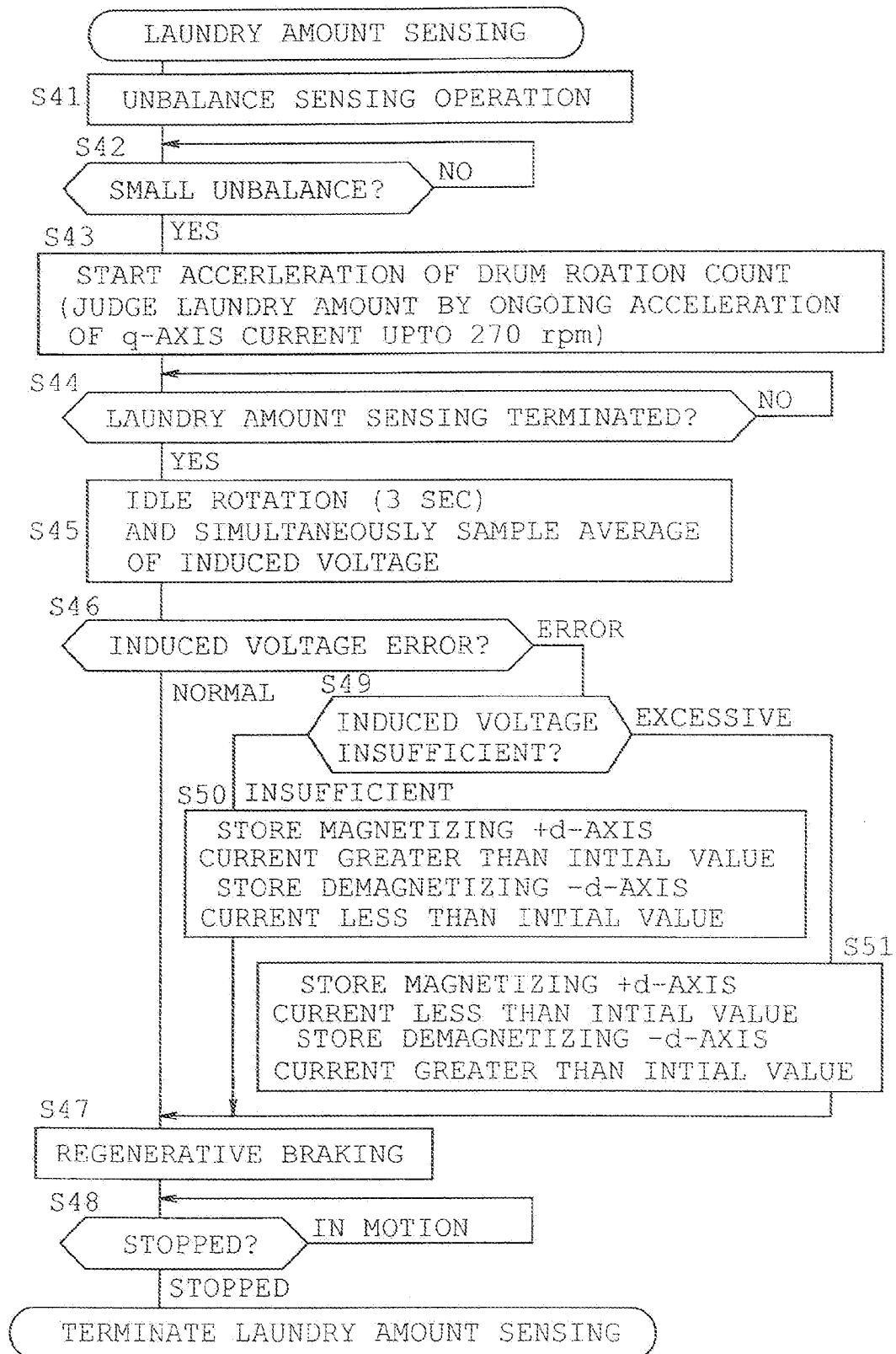
FIG. 14 corresponds to FIG. 12 and illustrates a sixth exemplary embodiment of the present disclosure.
Figure 15:
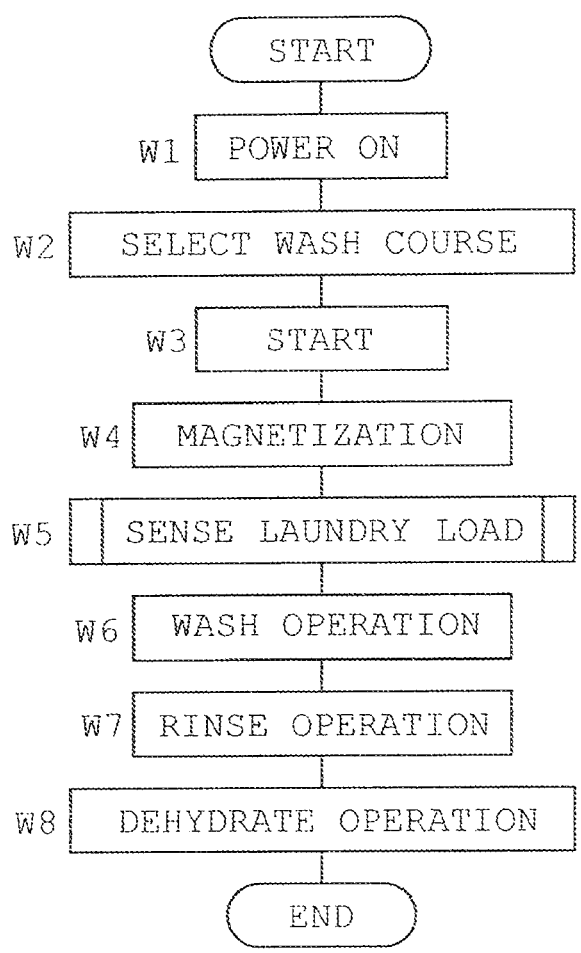
FIG. 15 is a flowchart schematically indicating the steps involved in a standard wash operation.

FIGS. 14 and 15 illustrate the sixth exemplary embodiment of the present disclosure, and a description will be given on the portions that differ from the fourth exemplary embodiment. In the sixth exemplary embodiment, variability in magnetism of alnico magnet 97 is tested through detection of induced voltage of drum motor 11 as was the case in the fourth exemplary embodiment with a difference in that the testing is carried out during laundry amount sensing executed in the normal wash operation executed by the washing machine.

FIG. 15 indicates the overall process flow of a standard wash operation which starts by turning on the power (step W1) and proceeds to wash course selection (step W2) and course operation start (step S3), whereafter control circuit 30 magnetizes alnico magnet 97 (step W4) to thereafter finally execute laundry amount sensing (step W5). Then, after determining the amount of detergent feed based on laundry amount, operations such as wash, rinse, and dehydrate are executed in the required sequence (steps W6 to W8).

In the sixth exemplary embodiment, the sensing process of step W5 is executed as indicated in FIG. 14. First, unbalance of laundry within rotary drum 4 is sensed (step S41) by referring to the unsteady q-axis current observed during low speed rotation of drum motor 11, and the system stands by (step S42) until the degree of unbalance becomes small enough to be suitable for laundry amount sensing. Once the unbalance becomes small enough (YES), drum motor 11 is accelerated to 270 rpm, for example, and the amount of laundry is evaluated (step S43) based on the q-axis current sensed during the acceleration.

Upon completing the sensing of laundry amount (step S44: YES), drum motor 11 is idly rotated for 3 seconds as done in steps S33 and S34 during which time period the average of the induced voltage is sampled (step S45) and abnormality evaluation is carried out (step S46) based on the induced voltage. If the result of evaluation is normal, regenerative braking is executed (step S47), and the rotation of drum motor 11 is stopped (step S48: YES).

On the other hand, when the result of evaluation is abnormal, further evaluation is made as to whether or not the induced voltage is insufficient compared to the state of magnetism of alnico magnet 97 (step S49). If the amount of magnetism is found to be insufficient, instructions to increase the level of the (+) direction d-axis current, outputted upon magnetization, from the initial value is stored in medium such as a memory. Similarly, the level of the (−) direction d-axis current, outputted upon demagnetization, is decreased from the initial value (step S50).

In contrast, if the induced voltage is excessive when compared to the magnetism of alnico magnet 97, the level of the (+) direction d-axis current, outputted upon magnetization, is decreased from the initial value, whereas (−) direction d-axis current outputted upon demagnetization is increased from the initial value (step S51).

According to the sixth exemplary embodiment described above, control circuit 30 evaluates whether or not variation of magnetism of alnico magnet 97 is controlled appropriately depending upon the level of induced voltage produced when drum motor 11 is idly rotated after being accelerated for laundry amount sensing, thus, functionality evaluation can be performed by the user in the user environment after product shipment of the washing machine. If the coercivity of alnico magnet 97 is reduced over time, the amount of magnetism can be adjusted as appropriate. Further, because magnetism evaluation is executed during the idle rotation after laundry amount sensing, drum motor 11 need not be rotated just for the purpose of magnetism evaluation to avoid increase in total run time.

Seventh Exemplary Embodiment

Figure 16:
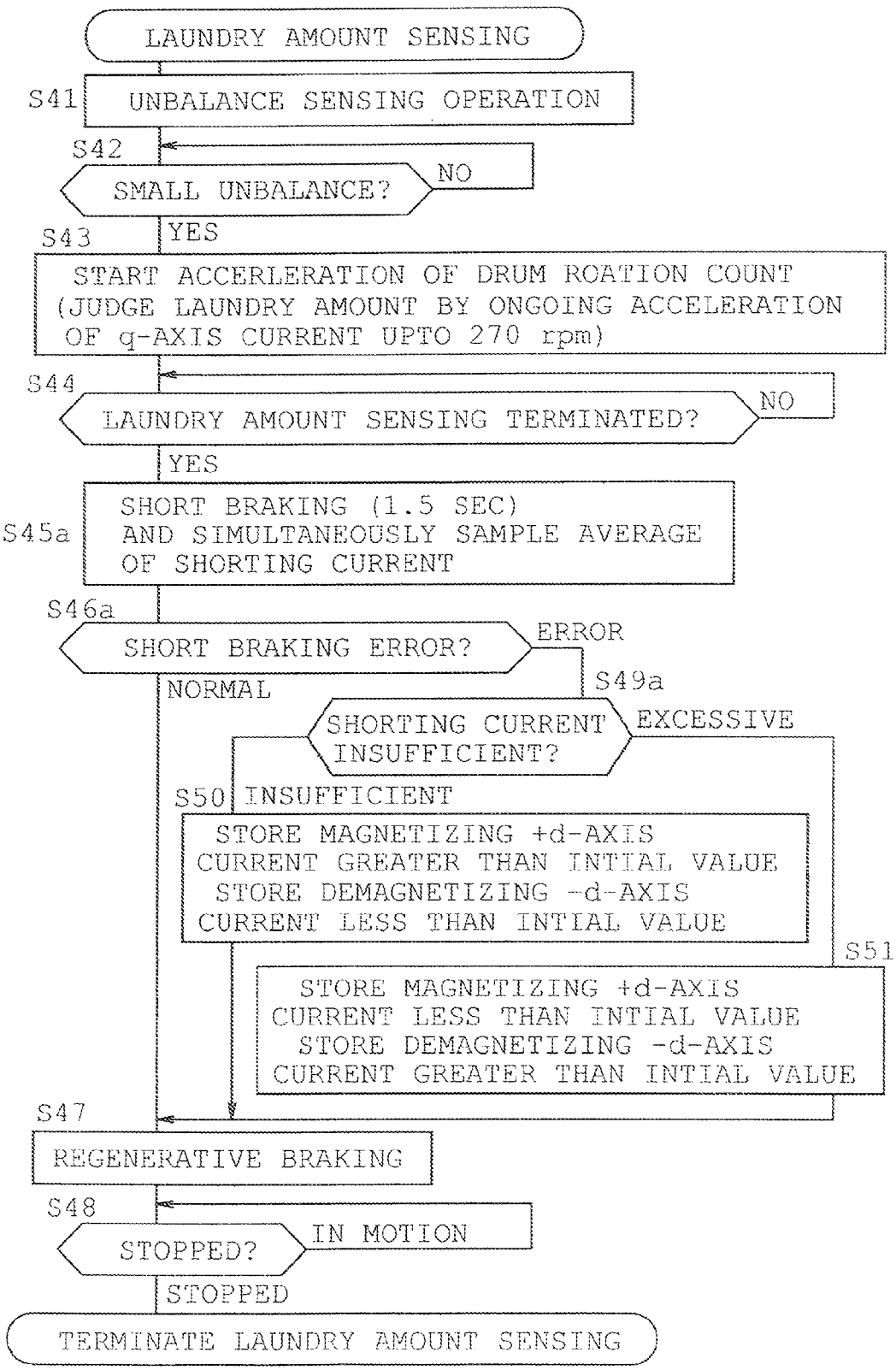
FIG. 16 corresponds to FIG. 14 and illustrates a seventh exemplary embodiment of the present disclosure.

FIG. 16 illustrates a seventh exemplary embodiment and a description will be given on portions that differ from the sixth exemplary embodiment. In the seventh exemplary embodiment, evaluation is made as to whether or not the amount of magnetism of alnico magnet 97 is successfully varied during laundry amount sensing as in the sixth exemplary embodiment with a difference in that the evaluation is based on the level of shorting current produced by short braking instead of induced voltage employed in the fifth exemplary embodiment.

That is, at step S45a, instead of idly rotating drum motor 11, short braking is applied on drum motor 11 for 1.5 seconds during which period the shorting current is sampled, and in the subsequent step S46a, abnormality is evaluated based on the average of the effective value of the sampled shorting current. If the result of evaluation is abnormal, lack or excess in the level of shorting current is evaluated at step S49a and steps S50 and S51 are executed based on the result of evaluation. The seventh exemplary embodiment described above provides effects similar to the sixth exemplary embodiment.

Eighth Exemplary Embodiment

Figure 17:
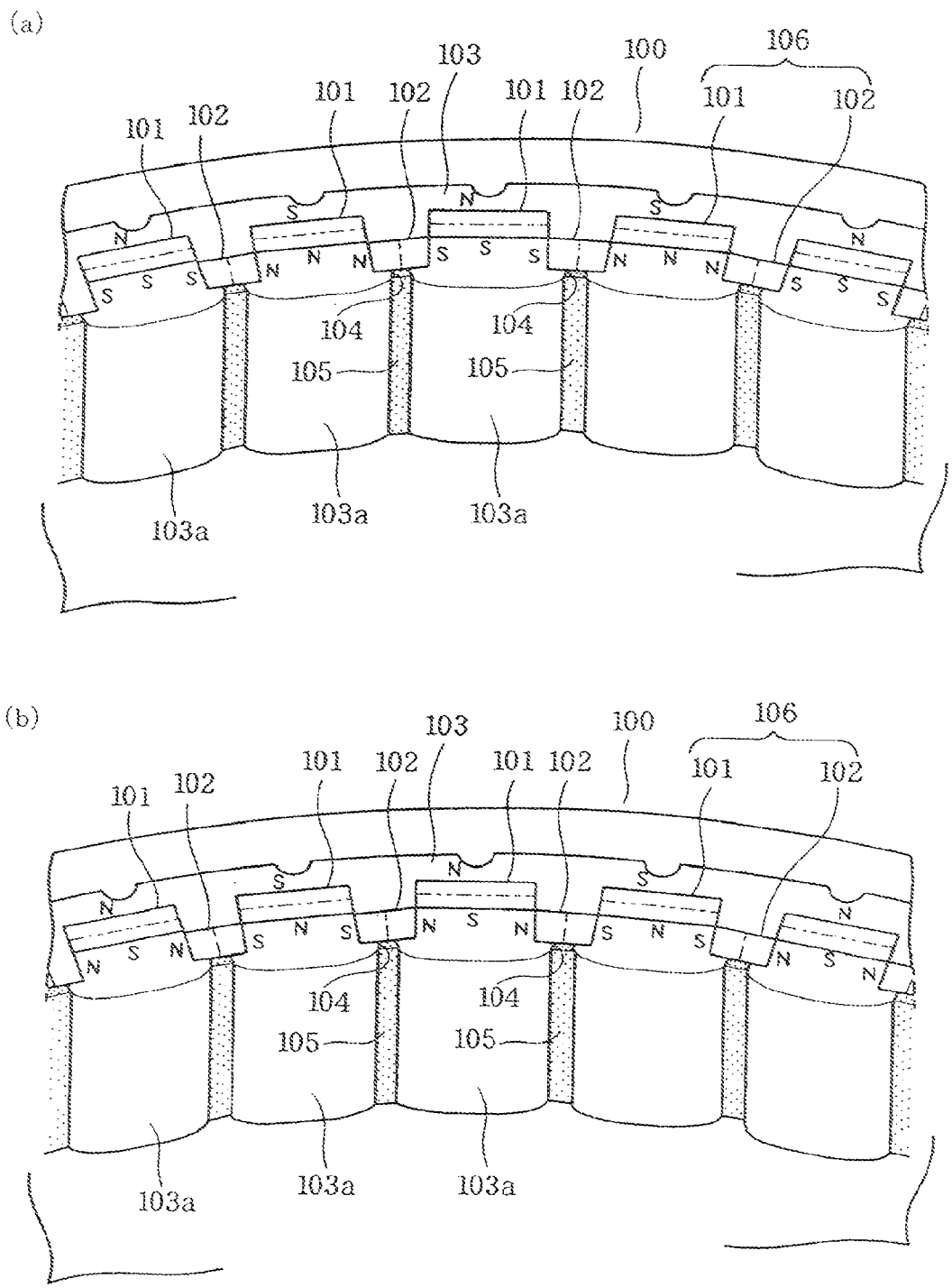
FIG. 17 corresponds to (b) of FIG. 5 and illustrates an eighth exemplary embodiment of the present disclosure.

FIG. 17 illustrates the eighth exemplary embodiment of the present disclosure which employs a drum motor that differs in the structure of the rotor. Multiplicity (48 magnets, for example) of neodymium magnets 101 (first permanent magnet) are disposed circumferentially at rotor 11 so that each magnet 101 corresponds to each of projections 103a provided at rotor core 103. Magnetism of neodymium magnet 101 is controlled so that its magnetic polarity differs radially. Alnico magnet 102 (second permanent magnet) is disposed between two neighboring projections 103a and closer toward stator 91 (refer to (a) of FIG. 5) as compared to neodymium magnet 101.

Magnetism of alnico magnet 102 is controlled so that its magnetic polarity differs circumferentially. One set of neodymium magnet 101 and a couple of left and right alnico magnets 102 constitute a single pole and alnico magnet 102 is shared between the neighboring poles. Rotor core 103 has opening 104 formed at the stator 91 side of alnico magnet 102 and opening 104 is filled with synthetic resin 105. Rotor magnet 106 is configured by neodymium magnet 101 and alnico magnet 102.

Next, a description will be given on the working of the eight exemplary embodiment. In increasing the magnetic flux of rotor magnet 106, magnetism of alnico magnet 102 is controlled so that the magnetic pole of the portion of alnico magnet 102 confronting its corresponding neodymium magnet 101 possess the same magnetic polarity as neodymium magnet 101 as shown in (a) of FIG. 17 (if projection 103a side of neodymium magnet 101 is north polarized, the portions of alnico magnet 102 confronting neodymium magnet 101 at the left and right sides of neodymium magnet are 101 also north polarized).

In contrast, in decreasing the magnetic flux of rotor magnet 106, magnetism of alnico magnet 102 is controlled so that the magnetic pole of the portion of alnico magnet 102 confronting the corresponding neodymium magnet 101 possess the opposite magnetic polarity to neodymium magnet 101 as shown in (b) of FIG. 17 (if projection 103a side of neodymium magnet 101 is north polarized, the portion of alnico magnet 102 confronting neodymium magnet 101 at the left and right sides of neodymium magnet 101 is south polarized).

According to the eight exemplary embodiment described above, rotor magnet 106 is configured so that one set of high coercivity neodymium magnet 101 and a couple of low coercivity alnico magnets 102 constitute a single pole and thus, magnetic polarity of alnico magnet 102 can be inversed to significantly increase/decrease the overall amount of magnetic flux of rotor magnet 106.

The present disclosure is not limited to the above described and shown exemplary embodiments but may be modified or expanded as follows.

First and second permanent magnets are not limited to neodymium and alnico magnets, but may employ different pairs of magnets as long as difference in magnetism between the pair of first and second magnets is great enough so that the variation of magnetism of the latter does not affect the magnetism of the former.

The output pattern of d-axis current upon execution of magnetization/demagnetization may be modified to suit the design being employed in different systems.

The present disclosure may be applied to washing machines without dry features.

The present disclosure is not limited to drum washing machine applications but may also be applied to vertical washing machines provided with rotating pulsators.

The present disclosure is further not limited to washing machines being controlled by field oriented control.

The present disclosure is not limited to application to outer rotor permanent magnet motors but may also be applied to inner rotor permanent magnet motors.

The second exemplary embodiment may be modified to execute magnetization after braking operation has been started at the time of completing the dehydrate operation.

The third exemplary embodiment being configured to evaluate the success/failure of activation based on whether or not maximum rotation count has been reached may be modified to employ lower rotation count as a threshold of evaluation. The limitation in the consecutive count of allowable failures in making the activation failure evaluation is not confined to 10.

The rotation axis of rotary drum 4 may be inclined by 10 to 15 degrees from horizontal.

INDUSTRIAL APPLICABILITY

As described above, the inverter device for washing machine in accordance with the present disclosure, when applied to washing machines that are driven to execute a wash operation by a permanent magnet motor provided with a rotor magnet comprising a second permanent magnet possessing a level coercivity that allows the amount of magnetism to be readily varied, is useful in that it allows improvement in drive efficiency through improvement in motor properties by modifying the amount of magnetism of the second permanent magnet.

What is claimed is:

1. An inverter device provided on a washing machine configured to execute a wash operation by rotational drive force exerted by a permanent magnet motor, the inverter device configured to control the permanent magnet motor, the permanent magnet motor comprising a stator including stator windings and a rotor magnet disposed on a rotor side of the permanent magnet motor, the rotor magnet comprising a first permanent magnet and a second permanent magnet having a level of coercivity smaller than the first permanent magnet, the level of coercivity of the second permanent magnet being small enough to allow variation in an amount of magnetism, the inverter device comprising:
   an inverter circuit configured to energize the stator windings; and
   a control circuit configured to control the energizing of the stator windings by the inverter circuit;
   a position detecting element configured to detect a rotational position of the rotor;
   wherein the control circuit causes the inverter circuit to produce an excitation current in the stator windings to vary the amount of magnetism of the second permanent magnet to execute a dehydrate operation with a magnetic flux of the rotor magnet reduced and to execute an operation at a lower maximum rotation count compared to the dehydrate operation with the magnetic flux of the rotor magnet increased; and
   wherein when the amount of magnetism of the second permanent magnet is varied while rotation of the permanent magnet motor is stopped, the control circuit switches a phase of the excitation current for varying the amount of magnetism depending on a rotation stop position indicated by a position signal outputted by the position detecting element of the rotor so that an amount of movement of the rotor is reduced.

2. An inverter device provided on a washing machine configured to execute a wash operation by rotational drive force exerted by a permanent magnet motor, the inverter device configured to control the permanent magnet motor, the permanent magnet motor comprising a stator including stator windings and a rotor magnet disposed on a rotor side of the permanent magnet motor, the rotor magnet comprising a first permanent magnet and a second permanent magnet having a level of coercivity smaller than the first permanent magnet, the level of coercivity of the second permanent magnet being small enough to allow variation in an amount of magnetism, the inverter device comprising:
an inverter circuit configured to energize the stator windings; and
a control circuit configured to control the energizing of the stator windings by the inverter circuit;
wherein the control circuit causes the inverter circuit to produce an excitation current in the stator windings to vary the amount of magnetism of the second permanent magnet to execute a dehydrate operation with a magnetic flux of the rotor magnet reduced and to execute an operation at a lower maximum rotation count compared to the dehydrate operation with the magnetic flux of the rotor magnet increased; and
wherein the control circuit increases the amount of magnetism of the second permanent magnet when executing a braking operation in which electric power produced at the stator windings is consumed for completing the dehydrate operation.

3. An inverter device provided on a washing machine configured to execute a wash operation by rotational drive force exerted by a permanent magnet motor, the inverter device configured to control the permanent magnet motor, the permanent magnet motor comprising a stator including stator windings and a rotor magnet disposed on a rotor side of the permanent magnet motor, the rotor magnet comprising a first permanent magnet and a second permanent magnet having a level of coercivity smaller than the first permanent magnet, the level of coercivity of the second permanent magnet being small enough to allow variation in an amount of magnetism, the inverter device comprising:
an inverter circuit configured to energize the stator windings; and
a control circuit configured to control the energizing of the stator windings by the inverter circuit;
wherein the control circuit causes the inverter circuit to produce an excitation current in the stator windings to vary the amount of magnetism of the second permanent magnet to execute a dehydrate operation with a magnetic flux of the rotor magnet reduced and to execute an operation at a lower maximum rotation count compared to the dehydrate operation with the magnetic flux of the rotor magnet increased; and
wherein when a plurality of dehydrate operations with different maximum rotation counts are being executed, the control circuit increases an amount of decrease in magnetism of the second permanent magnet as the maximum rotation count becomes greater.

4. An inverter device provided on a washing machine configured to execute a wash operation by rotational drive force exerted by a permanent magnet motor, the inverter device configured to control the permanent magnet motor, the permanent magnet motor comprising a stator including stator windings and a rotor magnet disposed on a rotor side of the permanent magnet motor, the rotor magnet comprising a first permanent magnet and a second permanent magnet having a level of coercivity smaller than the first permanent magnet, the level of coercivity of the second permanent magnet being small enough to allow variation in an amount of magnetism, the inverter device comprising:
an inverter circuit configured to energize the stator windings; and
a control circuit configured to control the energizing of the stator windings by the inverter circuit;
wherein the control circuit causes the inverter circuit to produce an excitation current in the stator windings to vary the amount of magnetism of the second permanent magnet to execute a dehydrate operation with a magnetic flux of the rotor magnet reduced and to execute an operation at a lower maximum rotation count compared to the dehydrate operation with the magnetic flux of the rotor magnet increased and
wherein the control circuit gradually increases the excitation current for varying the amount of magnetism.

5. An inverter device provided on a washing machine configured to execute a wash operation by rotational drive force exerted by a permanent magnet motor, the inverter device configured to control the permanent magnet motor, the permanent magnet motor comprising a stator including stator windings and a rotor magnet disposed on a rotor side of the permanent magnet motor, the rotor magnet comprising a first permanent magnet and a second permanent magnet having a level of coercivity smaller than the first permanent magnet, the level of coercivity of the second permanent magnet being small enough to allow variation in an amount of magnetism, the inverter device comprising:
an inverter circuit configured to energize the stator windings; and
a control circuit configured to control the energizing of the stator windings by the inverter circuit
wherein the control circuit causes the inverter circuit to produce an excitation current the stator windings to vary the amount of magnetism of the second permanent magnet to execute a dehydrate operation with a magnetic flux of the rotor magnet reduced and to execute an operation at a lower maximum rotation count compared to the dehydrate operation with the magnetic flux of the rotor magnet increased and
wherein during a wash/rinse operation, when a rotation count required for the wash/rinse operation is not obtained, the control circuit repeats a process for increasing the magnetism of the second permanent magnet.

6. An inverter device provided on a washing machine configured to execute a wash operation by rotational drive force exerted by a permanent magnet motor, the inverter device configured to control the permanent magnet motor, the permanent magnet motor comprising a stator including stator windings and a rotor magnet disposed on a rotor side of the permanent magnet motor, the rotor magnet comprising a first permanent magnet and a second permanent magnet having a level of coercivity smaller than the first permanent magnet, the level of coercivity of the second permanent magnet being small enough to allow variation in an amount of magnetism, the inverter device comprising:
an inverter circuit configured to energize the stator windings; and
a control circuit configured to control the energizing of the stator windings by the inverter circuit;
wherein the control circuit causes the inverter circuit to produce an excitation current in the stator windings to vary the amount of magnetism of the second permanent magnet to execute a dehydrate operation with a magnetic flux of the rotor magnet reduced and to execute an operation at a lower maximum rotation count compared to the dehydrate operation with the magnetic flux of the rotor magnet increased and wherein the control circuit evaluates whether or not the amount of magnetism of the second permanent magnet is properly controlled based on a level of induced voltage produced when the permanent magnet motor is idly rotated by a predetermined rotation speed.

7. An inverter device provided on a washing machine configured to execute a wash operation by rotational drive force exerted by a permanent magnet motor, the inverter device configured to control the permanent magnet motor, the permanent magnet motor comprising a stator including stator windings and a rotor magnet disposed on a rotor side of the permanent magnet motor, the rotor magnet comprising a first permanent magnet and a second permanent magnet having a level of coercivity smaller than the first permanent magnet, the level of coercivity of the second permanent magnet being small enough to allow variation in an amount of magnetism, the inverter device comprising:

an inverter circuit configured to energize the stator windings; and a control circuit configured to control the energizing of the stator windings by the inverter circuit;

wherein the control circuit causes the inverter circuit to produce an excitation current in the stator windings to vary the amount of magnetism of the second permanent magnet to execute a dehydrate operation with a magnetic flux of the rotor magnet reduced and to execute an operation at a lower maximum rotation count compared to the dehydrate operation with the magnetic flux of the rotor magnet increased and wherein the control circuit evaluates whether or not the amount of magnetism of the second permanent magnet is properly controlled based on a level of a shorting current produced when a short braking operation is executed while the permanent magnet motor is idly rotated at a predetermined speed.

* * * * *